US010023805B2

(12) United States Patent
Schneider

(10) Patent No.: US 10,023,805 B2
(45) Date of Patent: Jul. 17, 2018

(54) PYROLYSIS SYSTEMS WITH SOLIDS RECYCLE

(71) Applicant: Blizzard Energy, Inc., Great Bend, KS (US)

(72) Inventor: Chuck Schneider, Ralston, NE (US)

(*) Notice: Subject to any disclaimer, the term of this patent is extended or adjusted under 35 U.S.C. 154(b) by 0 days.

(21) Appl. No.: 15/014,912

(22) Filed: Feb. 3, 2016

(65) Prior Publication Data

US 2017/0029709 A1 Feb. 2, 2017

Related U.S. Application Data

(60) Provisional application No. 62/197,432, filed on Jul. 27, 2015.

(51) Int. Cl.
| | |
|---|---|
| C09C 1/48 | (2006.01) |
| C10B 53/07 | (2006.01) |
| C10B 57/02 | (2006.01) |
| C10B 7/14 | (2006.01) |
| C10B 21/12 | (2006.01) |
| C10B 27/06 | (2006.01) |
| C10B 41/00 | (2006.01) |
| C10B 45/00 | (2006.01) |
| C10B 47/06 | (2006.01) |

(52) U.S. Cl.
CPC ............... *C10B 53/07* (2013.01); *C09C 1/48* (2013.01); *C09C 1/482* (2013.01); *C10B 7/14* (2013.01); *C10B 21/12* (2013.01); *C10B 27/06* (2013.01); *C10B 41/00* (2013.01); *C10B 45/00* (2013.01); *C10B 47/06* (2013.01); *C10B 57/02* (2013.01); *Y02P 20/143* (2015.11)

(58) Field of Classification Search
CPC ...................................................... C09C 1/48
See application file for complete search history.

(56) References Cited

U.S. PATENT DOCUMENTS

| | | | | |
|---|---|---|---|---|
| 7,371,308 | B1 * | 5/2008 | Hackl | C10B 1/04 201/25 |
| 8,349,285 | B2 * | 1/2013 | MacIntosh | C01B 31/02 110/104 B |
| 8,888,961 | B2 | 11/2014 | Horn et al. | |
| 2005/0234274 | A1 | 10/2005 | Bernd | |

FOREIGN PATENT DOCUMENTS

| | | |
|---|---|---|
| CN | 1649981 A | 8/2005 |
| WO | 03/091359 A1 | 11/2003 |

OTHER PUBLICATIONS

Pavlova, Antoaneta, Characterization of the Spent Tire Catalytic Pyrolysis Products: Gasoline and the Fraction Boiling above 200° C., Petroleum and Coal, Jan. 2013, 55 (4) pp. 283-290.
Line for Processing of Carbon Black, You Tube Video Stills, Published don Mar. 4, 2013, retrieved at https://www.youtube.com/watch&v=LIVt6AYdrZg, 32 pages.
Possible Ways to Sell Pyrolysis Product—Carbon (soot)., You Tube Video Stills, Published on Feb. 28, 2013, retrieved at https://www.youtube.com/watch?v=eHL_bKa1YmU, 10 pages.
Pirotex: Plant for Tyre and Plastic Recycling, You Tube Video Stills, Published on Feb. 21, 2013, retrieved at https://youtube.com/watch?v=AlbSxCgVQT4, 66 pages.
Shipment of Pirotex 20 Ton to the USA, You Tube Video Stills, Published on Mar. 30, 2013, retrieved at https://www.youtube.com/watch?v=sO9xSoLyVs0, 18 pages.
Yang, Yongrong et al., Technical Advance on the Pyrolysis of Used Tires in China, China-Japan International Academic Symposium, Environmental Problem in Chinese Iron-Steelmaking Industries and Effective Technology Transfer, Sendai, Japan, Mar. 6, 2000, pp. 84-93.
Petrich, William, Novel Uses for Tire Pyrolysis Char, United Carbon Corporation, Abstracts of Papers of the American Chemical Society, vol. 220, 2000, pp. 455-457.
Pilusa, Jefrey et al., Beneficiation of Pyrolitic Carbon Black, International Journal of Chemical, Nuclear, Materials and Metallurgical Engineering vol. 7, No. 10, 2013, pp. 392-396.
Washington State Department of Transporation, Carbon Black Additive in Asphalt, Project No. 3 WA84-04/WA-RD 198A, Post-Construction/Annual Report, Oct. 1989, 25 pages.
Insights on Carbon Black Fundamentals, not dated, retrieved on Jun. 2, 2015 at www.moderndispersions.com, 8 pages.
Patnaik, Tom et al., Carbon Black: Why Quality Mailers, Rubber & Plastic News, Dec. 13, 2010, www.rubbernews.com, pp. 16-18.
Zeng, Yongdong et al., Effect of Pyrolyzed Carbon Black on Asphalt Cement, School of Civil Engineering, Indiana Department of Transportation, Purdue University, Feb. 20, 1996, 159 pages.
Fader, J.H. et al., Using Pyrolyzed Carbon Black (FBp) from Waste Tires in Asphalt Pavements, Sveldala Industries Inc., Pyro Division, process Research and Test Center, Oct. 21, 1997, 21 pages.
Martinez, J.D. et al., Production of Carbon Black from the Waste Tire Pyrolysis, Instituto de Carboquimica (ICB-CSIC), Zaragoza, Spain, Bol. Grupo Espanol Carbon, No. 10, pp. 10-14.
IFW Recycling Corporation, Tire pyrolyzing Process, not dated, retrieved Mar. 2, 2015, 17 pages.
Technokomplex Product Website: Pirotex Pyrolysis Plant: Recycling and Utilization of Scrap Tires, Mechanical Rubber goods, Plastics, Polyethylene, Polyethylene Terephthalate, Oil Sludge, Waste Oils, Principles of the Unit Pirotex Operation, http://www.tkomplex.ru/en/products/pirotex, 5 pages.
Resem, Tire Pyrolysis Plant to Oil with New Patent, http://www.pyrolysisoil.net/INDUSTRY_INSIGHTS/Pyrolysis_Technology/tire-pyrolysis-plant-to-oil-with-new-patent.html, Oct. 25, 2013, 2 pages.
Oyedun, Adetoyese O., et al., Optimisation of Operating Parameters in Multi-Stage Pyrolysis, Chemical Engineering Transactions, vol. 29, 2012, pp. 655-660.

* cited by examiner

*Primary Examiner* — Stuart Hendrickson
(74) *Attorney, Agent, or Firm* — Patent Law Offices of Rick Martin, P.C.

(57) ABSTRACT

Systems and methods for processing pyrolyzable materials in order to recover one or more usable end products are provided. Pyrolysis methods and systems according to various aspects of the present invention are able to thermally decompose carbon-containing materials, including, for example, tires and other rubber-containing materials, in order recover hydrocarbon-containing products including synthesis gas, pyrolysis oil, and carbon black. Systems and methods according to aspects of the present invention may be successful on a commercial scale, and may be suitable for processing a variety of feedstocks, including, but not limited to, used tires and other types of industrial, agricultural, and consumer waste materials.

6 Claims, 9 Drawing Sheets

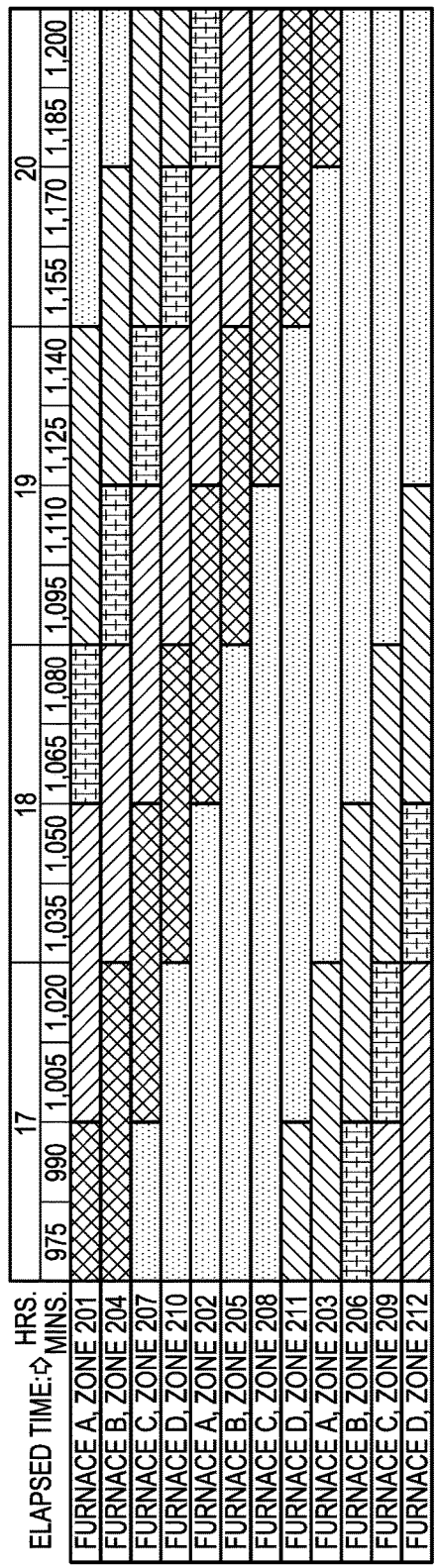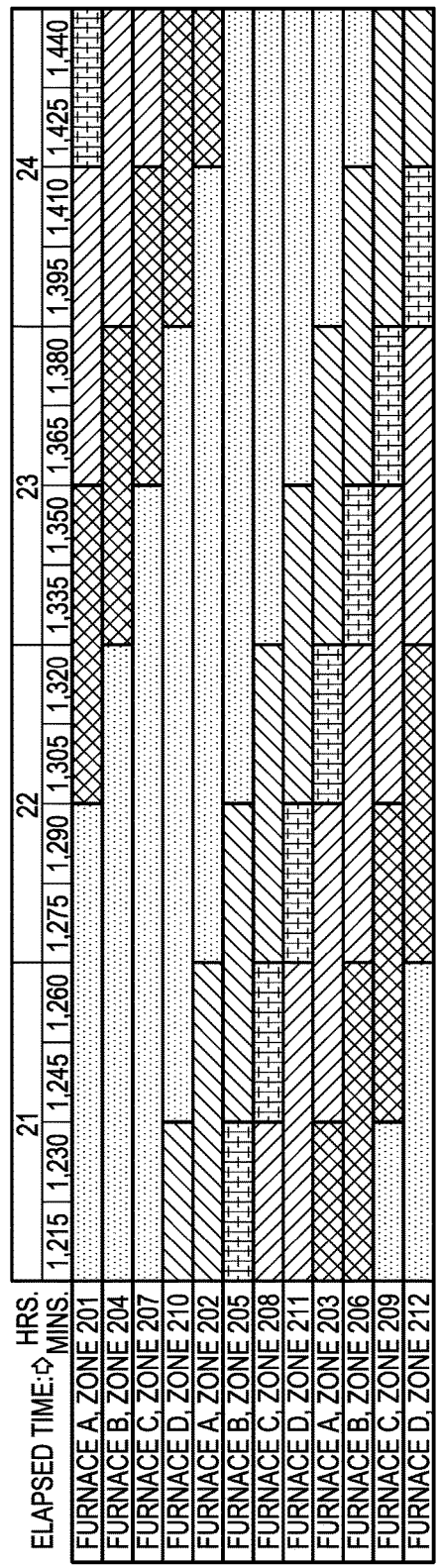
FIG. 3c

PYROLYSIS SYSTEMS WITH SOLIDS RECYCLE

CROSS-REFERENCE TO RELATED APPLICATIONS

This application claims priority to U.S. Provisional Patent Application Ser. No. 62/197,432, filed on Jul. 27, 2015, which is incorporated herein by reference in its entirety.

BACKGROUND

1. Field of the Invention

The present invention relates generally to systems and methods for pyrolyzing carbon-containing materials.

2. Description of Related Art

In general, pyrolysis is a process of thermochemically decomposing carbon-containing materials at an elevated temperature and in the absence of oxygen. Pyrolysis may be used to convert carbon-containing materials including, for example, rubber-containing composites such as tires and other industrial rubber and rubber-based items, into other materials, including carbon- and hydrocarbon-containing compounds like pyrolysis oils, residue gases, and carbonaceous solids. In addition to providing a more environmentally-benign method of disposing of various carbon-containing waste materials, such as, for example, used tires, pyrolysis also provides an opportunity to create valuable end products, which may themselves be further usable, salable, and/or recyclable. To date, a commercial-scale pyrolysis facility capable of efficiently and predictably recovering valuable products from various carbon-containing feedstocks has yet to be provided.

Therefore, a need exists for systems and method of pyrolyzing carbon-containing material to create valuable end products. Ideally, such systems and methods could be employed on a commercial scale and could be configured to process a wide variety of feedstocks, while still providing products with predictable and desirable properties.

SUMMARY

One aspect of the present invention concerns a method of pyrolyzing a rubber-containing material. The method includes the steps of (a) at least partially filling a first crucible with a first quantity of the rubber-containing material; (b) heating the first crucible in a pyrolysis zone under conditions sufficient to pyrolyze at least a portion of the first quantity of the rubber-containing material to thereby provide pyrolysis vapors and pyrolysis solids; (c) cooling the pyrolysis solids within the first crucible to form a first quantity of cooled pyrolysis solids, wherein the first quantity of cooled pyrolysis solids comprises carbon black and at least partially unpyrolyzed rubber-containing material; (d) returning at least a portion of the first quantity of cooled pyrolysis solids to the pyrolysis zone; and (e) heating at least a portion of the returned pyrolysis solids in the pyrolysis zone under conditions sufficient to pyrolyze at least a portion of the unpyrolyzed rubber-containing material in the returned pyrolysis solids.

Another aspect of the present invention concerns a method of pyrolyzing a rubber-containing material. The method includes the steps of (a) at least partially filling a crucible with a first quantity of the rubber-containing material; (b) heating the crucible in a pyrolysis zone under conditions sufficient to pyrolyze at least a portion of the first quantity of the rubber-containing material to thereby provide pyrolysis vapors and pyrolysis solids; (c) cooling the pyrolysis solids within the crucible to form cooled pyrolysis solids; (d) measuring at least one value of at least one property of the cooled pyrolysis solids; (e) comparing the measured value of the property to a target value for the property to determine a difference; (f) when the difference is greater than a predetermined amount, returning at least a portion of the cooled pyrolysis solids to the pyrolysis zone, wherein the returned pyrolysis solids comprise at least partially unpyrolyzed material; and (g) heating the returned pyrolysis solids under conditions sufficient to pyrolyze at least a portion of the unpyrolyzed material.

BRIEF DESCRIPTION OF THE DRAWINGS

FIG. 3c is a chart illustrating the overall heating cycle of crucibles 250a-250l in the pyrolysis zone 214 shown in FIG. 2, particularly illustrating the processing steps for each of crucibles 250a-250l during the last eight hours of a 24-hour cycle;

DESCRIPTION

Figure 1:
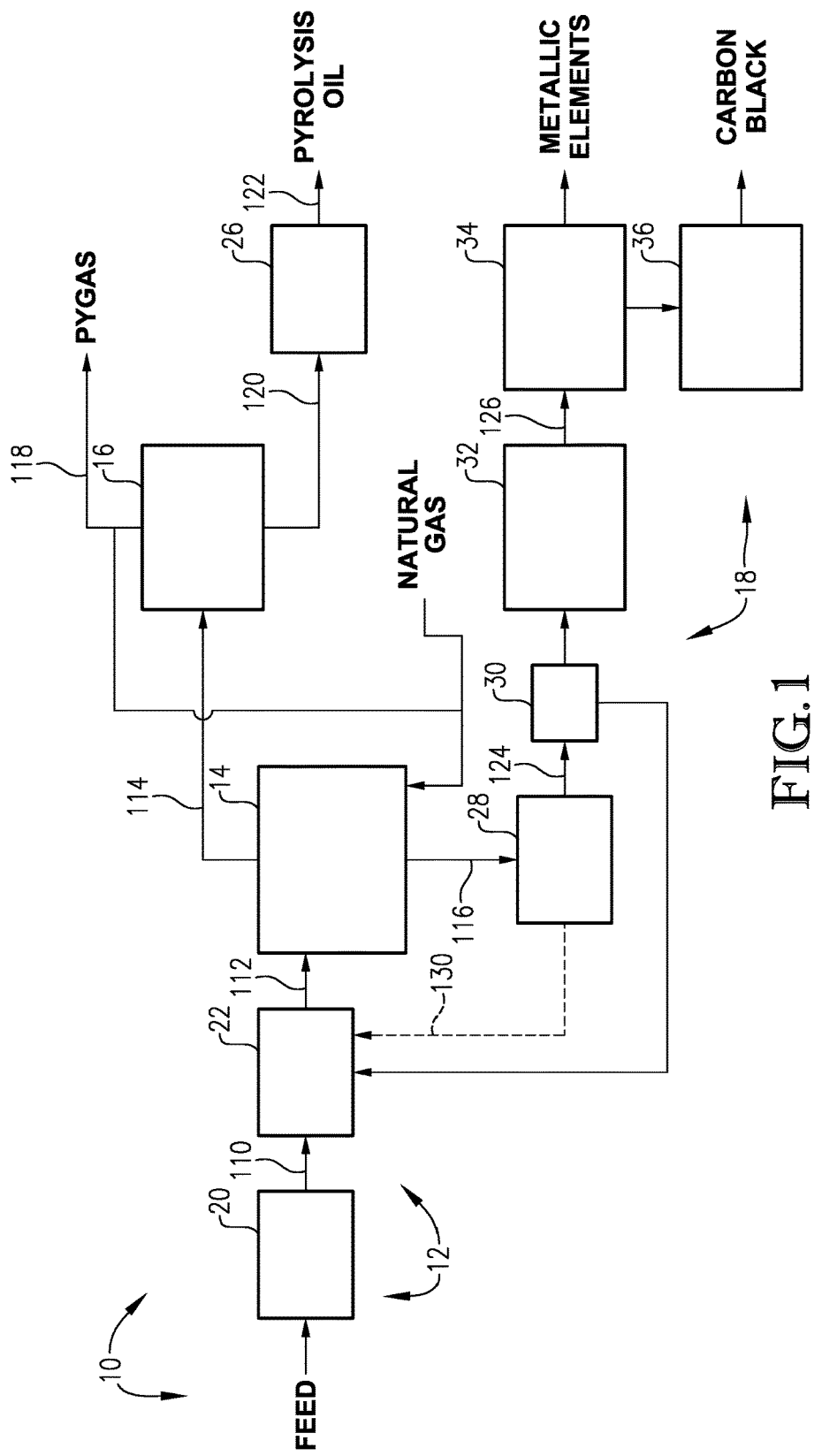
FIG. 1 is a schematic diagram of an exemplary pyrolysis facility 10, particularly illustrating various areas within the facility and the relationships between these areas.

Turning initially to FIG. 1, a schematic depiction of a pyrolysis facility 10 capable of pyrolyzing rubber and other carbon-containing materials to form a variety of valuable end products is provided. As shown in FIG. 1, pyrolysis facility 10 includes a feed preparation zone 12, a pyrolysis zone 14, a separation zone 16, and a solids processing zone 18. During pyrolysis of a carbon-containing material, larger carbon-containing molecules may be thermally decomposed and chemically modified in order to provide a lighter hydrocarbon pyrolysis vapor and a carbon-rich residual solid material. In some cases, the pyrolysis performed in pyrolysis facility 10 may be low temperature pyrolysis, which is generally carried out at temperatures less than about 1,000° F., or it may be high temperature pyrolysis, which is generally performed at temperatures exceeding 1,000° F. Additional details regarding the operation of pyrolysis facility 10 will be described herein, with respect to the Figures.

Pyrolysis facility 10 shown in FIG. 1 can be configured to process one or more types of feed. Any pyrolyzable carbon-containing materials may be used, including, for example, rubber and rubber-containing materials, plastics, wood, paper, biomass such as agricultural and forestry waste materials, coal, oils, including waste oil, and the like. Examples of suitable rubber-containing materials can include, but not limited to, tires, rubber-coated chains, reinforced rubber belts, mats, hoses, tubing, and combinations thereof. The pyrolyzable feed introduced into pyrolysis facility 10 can include one or more types of waste materials, including industrial waste materials, consumer waste materials, and/or agricultural waste materials, that otherwise have limited or no further use. Although generally described herein with respect to rubber-containing materials, it should be understood that pyrolysis facility 10 may additionally, or alternatively, be configured to process any suitable pyrolyzable material, including one or more of the carbon-containing materials listed above. In some cases, pyrolysis facility 10 may be configured to process a single feedstock, or a limited number of feedstocks, while, in other cases, pyrolysis facility 10 may be capable of pyrolyzing a wide range of feedstocks.

The feedstock introduced into facility 10 can be in any size and of any shape capable of being pyrolyzed within the facility. The feedstock may be introduced into facility 10 in a ready-to-process form, or it may require additional treatment prior to pyrolysis. When the feedstock includes tires, the tires delivered to facility 10 may be whole tires or the tires may be pre-shredded or ground into smaller pieces. When shredded, the average length, or longest dimension, of the tire feedstock can be at least about 0.5 inches, at least about 1 inch, or at least about 2 inches and/or not more than about 15 inches, not more than about 10 inches, not more than about 8 inches, not more than about 6 inches, or not more than about 5 inches. The tire feedstock may be pre-sorted, for example, by manufacturer, by type of tire (e.g., road tire, agricultural tire, heavy equipment tire, etc.), and/or by specific tire component (e.g., sidewall, bead, tread, etc.). Alternatively, the feedstock may include a mixture of tires from several manufacturers, it may include several types of tires, and/or it may include multiple tire components.

As shown in FIG. 1, the pyrolyzable feedstock introduced into pyrolysis facility 10 is initially introduced into a pretreatment and storage zone 20, wherein the feedstock may be pretreated, as needed, and/or stored prior to pyrolysis. In pretreatment and storage zone 20, the feedstock can be prepared, as needed, for subsequent pyrolysis by, for example, washing, drying, sorting, and/or shredding the feedstock into a more processable form. When, for example, the feedstock includes a mixture of tires, the tires may be sorted in pretreatment and storage zone 20 by manufacturer and/or by type, as discussed above. Alternatively, or in addition, whole tires may be shredded and, optionally separated into component parts, within pretreatment and storage zone 20, using suitable equipment. Pretreatment and storage zone 20 may also include one or more storage containers, areas, bunkers, or silos for storing the feed prior to pyrolysis.

As shown in FIG. 1, the feed exiting pretreatment and storage zone 20 can be transferred to a filling zone 22 via line 110. Any suitable transfer device can be used to move the feed from pretreatment and storage zone 20 to filling zone 22. Examples of transfer devices can include, but are not limited to, convey devices like conveyor belts and walking floors, or mobile vehicles such as a cart, trailer, or fork lift.

In filling zone 22, the pyrolyzable feed transferred from pretreatment and storage zone 20 via line 110 is loaded into one or more crucibles. A crucible can be any sealable container, capable of withstanding elevated temperatures, that is able to facilitate pyrolysis of the materials contained therein. Crucibles can be formed of any suitable material that is inert to the contents and capable of withstanding elevated pyrolysis temperatures. Such materials include, but are not limited to, steel or other similar metal. Crucibles can have any desirable size and/or shape and may, for example, have an internal volume of at least about 15 cubic feet, at least about 25 cubic feet, or at least about 30 cubic feet and/or not more than about 150 cubic feet, not more than about 100 cubic feet, not more than about 75 cubic feet, or not more than about 50 cubic feet. In some cases, the crucibles may be cylindrical and may have a diameter of at least about 2 feet, at least about 2.5 feet, or at least about 3 feet and/or not more than about 6 feet, not more than about 5 feet, or not more than about 4 feet, with a length of at least about 3 feet, at least about 3.5 feet, or at least about 4 feet and/or not more than about 8 feet, not more than about 7 feet, or not more than about 6 feet. The exact size and shape of the crucible may depend, in part, on the specific furnace configuration and desired batch size.

In filling zone 22, one or more crucibles may be at least partially filled with pyrolyzable feedstock which, can, for example, comprise a rubber-containing material. The amount of feed introduced into the crucible may vary depending on several factors, including the total production capacity of the facility, the size and shape of the crucibles, the type and form of the feed, the configuration of the furnace, and combinations thereof. In some cases, each crucible may be placed on a scale, tared, and filled with at least about 250, at least about 350, at least about 450, at least about 500 pounds, at least about 600 pounds, or at least about 700 pounds and/or not more than about 1,000 pounds, not more than about 900 pounds, or not more than about 800 pounds of pyrolyzable feed. Depending on the size of the crucible, this may result in at least 50 percent, at least 75 percent, at least 85 percent, or at least 90 percent of the total internal volume of the crucible being filled with pyrolyzable feed. The crucibles can be filled individually in sequence, or two or more crucibles may be filled simultaneously. Additionally, each crucible may be filled on an as-needed basis, or one or more crucibles may be pre-filled and held in a holding area (not shown) to await transfer into pyrolysis zone 14, which will be discussed in detail shortly. The crucibles can be filled according to any suitable method, including manually, by forklift, or by a hydraulic device.

Once filled, the crucible may be sealed by placing and securing a removable cover to the top of the crucible. Optionally, prior to securing the cover onto the crucible, a gasket may be inserted between the crucible and the cover in order to facilitate a better seal between the two components and prevent outward leakage or oxygen ingress during heating. When used, the gasket may be a high temperature reusable gasket capable of being exposed to multiple temperature cycles without losing functionality. After placement of the gasket, if any, the cover may then be secured onto the crucible in any suitable manner and can, for example, be bolted onto an upper flange surface of the crucible. In this way, the cover may be removably coupled to the crucible so that it may be subsequently removed, after pyrolysis, to facilitate emptying and refilling of the crucible for further pyrolysis cycles. In some cases, an overhead transport crane or other lift device may be used to place the cover onto the crucible and/or to transport the cover to and from a cover storage area (not shown).

In addition to being configured to seal the crucible, the cover may also include one or more outlets configured to connect the crucible to one or more systems within the facility during pyrolysis. For example, the cover may include a product outlet for connecting the crucible with a hydrocarbon collection system configured to collect and process the vapor generated during pyrolysis. The cover may also include at least one vent outlet configured for connecting the crucible to a pressure relief system. The vent outlet may include at least one relief valve or device, such as a rupture disk, that opens to vent the crucible in the case of an overpressure. The cover may also optionally include one or more inlets for control system indicators, such as temperature and/or pressure indicators, that may provide information on various process parameters useful for operating and optimizing the system.

Once sealed, the at least partially filled crucibles can be transported to pyrolysis zone 14 by any suitable transfer device, which is represented by line 112 in FIG. 1. Examples of suitable transfer devices include, but are not limited to, a fork lift or overhead crane system. In some cases when pyrolysis zone 14 includes two or more pyrolysis furnaces, a single transfer device, such as an overhead lift system, may be configured to load crucibles into each furnace. Once loaded into a furnace, the crucible may be connected to, and subsequently de-isolated from, hydrocarbon collection and pressure relief systems. Additionally, any instrumentation, such as thermocouples or pressure indicators, may also be connected prior to initiating the pyrolysis cycle. The crucible may be secured into a stationary position within the furnace, such that it does not rotate or otherwise change position during heating.

Each individual pyrolysis cycle may be initiated by first preheating the at least partially filled crucible to a maximum temperature of at least about 300° F., at least about 350° F., or at least about 375° F. and/or not more than about 600° F., not more than about 550° F., not more than about 500° F., or not more than about 450° F., or it can be in the range of from about 300° F. to about 600° F., about 350° F. to about 550° F., or about 375° F. to about 500° F. Unless otherwise noted, the temperature of the crucible refers to the temperature of the interior of the crucible measured with a temperature indicator or other equivalent device. The pressure within the crucible during the preheating step may be at least about 0.5 pounds per square inch, gauge, (psig), at least about 1 psig, at least about 1.5 psig, at least about 2 psig, at least about 3 psig, at least about 5 psig and/or not more than about 20 psig, not more than about 15 psig, not more than about 10 psig, not more than about 8 psig.

Generally, this preheating step may have a duration in the range of at least about 15 minutes, at least about 30 minutes, or at least about 45 minutes and/or not more than about 120 minutes, not more than about 90 minutes, or not more than about 60 minutes. During this time, the furnace may be controlled to maximize the heating rate by, for example, having the furnace burner fully open.

After preheating, the crucible may then be further heated to a temperature of at least about 700° F., at least about 750° F., at least about 800° F., or at least about 825° F. and/or not more than about 1,500° F., not more than about 1,250° F., not more than about 1,100° F., not more than about 1,000° F., or not more than about 950° F. Other temperatures, higher or lower than the above, may also be utilized, depending on the specific type of carbon-containing material being pyrolyzed. In some cases, temperatures within the above ranges may be suitable for the pyrolysis of rubber-containing materials.

The pressure within the crucible during the pyrolysis step may be at least about 0.5 pounds per square inch, gauge, (psig), at least about 1 psig, at least about 1.5 psig, at least about 2 psig, at least about 3 psig, at least about 5 psig and/or not more than about 20 psig, not more than about 15 psig, not more than about 10 psig, not more than about 8 psig. The oxygen content within the crucible during the heating steps may be less than about 0.05 volume percent, less than 0.01 volume percent, or less than 0.005 volume percent, based on the total moles of vapor within the crucible. This heating step may continue for a period of time of at least about 30 minutes, at least about 45 minutes, at least about 1 hour, at least about 2 hours and/or not more than about 5 hours, not more than about 4 hours, or not more than about 3 hours.

During pyrolysis, the carbon-containing material within the crucible thermochemically decompose to provide a hydrocarbon-containing pyrolysis vapors and residual pyrolysis solids. The amounts and composition of the pyrolysis vapors and residual solids depend, in large part, on the type and composition of the pyrolyzable feedstock, as well as on the pyrolysis conditions. When, for example, the feedstock comprises a rubber-containing material, such as a tire or other rubber-containing components, the pyrolysis vapors formed include vaporized hydrocarbon components such as, for example, methane, ethane, propane, butane, pentane, and heavier, along with isomers and olefins of these components. The residual solid phase, also called the "pyrolysis solids," can include both carbon-rich solid residual, or "carbon black," as well as any other unpyrolyzable solid elements, such as metal elements, unpyrolyzed feed, and/or inorganic ash.

Upon achievement of the pyrolysis temperature, the crucible can be maintained at that temperature, through adequate burner control, for a hold period of at least about 60 minutes, at least about 90 minutes, or at least about 120 minutes and/or not more than about 300 minutes, not more than about 240 minutes, not more than about 180 minutes, or not more than about 150 minutes to permit further decomposition of the pyrolyzable material. After the hold period, the burner air damper may be closed, thereby stopping the active heating of the crucible, and the pyrolysis reaction can be permitted to continue, autothermally, for another hold period of at least about 15 minutes, at least about 30 minutes, or at least about 45 minutes and/or not more than about 300 minutes, not more than about 240 minutes, not more than about 180 minutes, not more than about 120 minutes, not more than about 90 minutes, or not more than about 60 minutes.

Upon completion of the second hold period, the furnace air damper may be opened, thereby permitting the crucible to cool within the furnace. Such a cooling may be performed for a period of at least about 15 minutes, at least about 30 minutes, or at least about 45 minutes and/or not more than about 120 minutes, not more than about 90 minutes, or not more than about 60 minutes before the crucible is again isolated from the collection and pressure relief systems, and removed from the furnace. At this point, another sealed crucible, at least partially filled with pyrolyzable feed, may be loaded into the open furnace position and a new pyrolysis cycle can begin. The overall cycle time of an individual crucible, from initiation of loading to completion of unloading, can be at least about 3 hours, at least about 4 hours, or at least about 4.5 hours and/or not more than about 10 hours, not more than about 8 hours, not more than about 7 hours, or not more than 6.5 hours.

The pyrolysis furnace, or furnaces, utilized in pyrolysis zone 14 of facility 10 can be any furnace capable of heating one or more crucibles under conditions sufficient to pyrolyze the materials contained therein. Pyrolysis zone 14 may include a single furnace with multiple individual heating zones, or it may include several furnaces, each having a single heating zone. Alternatively, pyrolysis zone 14 may include at least one, or two or more, furnaces that each include two or more individual heating zones. In total, pyrolysis zone 14 can include at least 1, at least 2, at least 3, at least 4, or at least 5 furnaces that collectively define at least 4, at least 5, at least 6, at least 7, at least 8, at least 9, at least 10, at least 11, at least 12, at least 13, at least 15, at least 18, or at least 20 individual heating zones. Each furnace can include at least 1, at least 2, at least 3, at least 4, or at least 5 individual heating zones disposed adjacent to one another within the furnace.

The individual heating zones disposed within one or more of the furnaces used in pyrolysis zone 14 may be individually controllable, and can be at least partially physically and/or thermally isolated from one another. As used herein, the term "physically isolated" refers to two spaces having at least one physical separation device disposed therebetween. Examples of physical separation devices can include, but are not limited to, a wall, a partial wall, a door, or other similar divider. As used herein, the term "thermally isolated" refers to two items or spaces that can be independently heated and/or cooled so that the temperature of one does not depend solely on the temperature of the other. Structurally, furnaces having thermally isolated heating zones may, for example, have heating zones configured to receive and heat a single crucible. In some cases, these individual heating zones may each include a single burner and an independent burner control system, so that each heating zone can be controlled independently to heat and cool a single crucible as described above. The burners may be configured to combust any suitable fuel, and, in some cases, may be configured only to combust a gas-phase fuel source, such as natural gas.

During the above-described pyrolysis cycle, the vapor phase formed within each crucible may be withdrawn and passed, via a collection header, to a downstream separation zone 16 via line 14, as shown in FIG. 1. The pyrolysis solids formed within the crucible during pyrolysis may remain within the crucible during the above-described heating and cooling steps, and may be removed from the furnace in the crucible after completion of the pyrolysis cycle. After pyrolysis, the crucible can be transported to a cooling zone 28 via line 116, wherein the pyrolysis solids may be permitted to cool further before being routed for further processing in solids processing zone 18, as shown in FIG. 1. Further details regarding the configuration and operation of each of separation zone 16 and solid processing zone 18 will be discussed shortly.

When pyrolysis facility 14 includes multiple individual heating zones and/or multiple furnaces, the heating cycles of each of the crucibles may be staged, or sequenced, in order to provide a continuous flow of vaporized hydrocarbon to the downstream separation zone 16 via line 114. In some cases, this may permit pyrolysis zone 14 may be operated in a batchwise manner, while separation zone 16 may be operated continuously. When sequential heating is used, each of the crucibles are exposed to the same heating cycle, but no two crucibles are on exactly the same cycle. As a result, one crucible may be undergoing one part of the pyrolysis cycle (e.g., preheating, pyrolysis, hold, cooling, or transferring), while one or more other crucibles may be undergoing another part of the pyrolysis cycle. Thus, for a given point in the pyrolysis cycle, one or more crucibles may be preheating, heating, holding, cooling, or being transferred simultaneously with at least a portion of the preheating, heating, holding, cooling, and/or transferring one or more other crucibles located in separate heating zones of the same or a different pyrolysis furnace.

For example, a first crucible at least partially filled with a quantity of pyrolyzable material could be undergoing pyrolysis in a first heating zone, while, at the same time, another crucible could be being loaded or unloaded into or out of a second heating zone. As used herein, the terms "first", "second," "third," and the like are used to describe various elements and such elements should not be limited by these terms. These terms are only used to distinguish one element from another and do not necessarily imply a specific order or even a specific element. For example, an element may be regarded as the "first" element in the description and a "second" element in the claims without being inconsistent and without unnecessarily limiting the present invention. Consistency is maintained within the description and each independent claim and any claims depending therefrom, but such nomenclature is not necessarily intended to be consistent therebetween.

In another example, a first crucible at least partially filled with a quantity of pyrolyzable material may be heated in a first individual heating zone under conditions sufficient to pyrolyze at least a portion of the pyrolyzable material therein, while a second crucible, at least partially filled with a quantity of one or more pyrolysis products, can be cooled in a second individual heating zone. The first and second heating zones can be in the same pyrolysis furnace, such that the second crucible is loaded into or unloaded out of the same pyrolysis furnace in which the first crucible is disposed during pyrolysis, or the first and second heating zones can be in different furnaces, such that the second crucible is loaded into a different pyrolysis furnace than the pyrolysis furnace in which the first crucible is being heated.

At the same time, a third crucible at least partially filled with e pyrolysis products can be transferred out of a third individual heating zone, while a fourth crucible at least partially filled with a quantity of pyrolyzable material can be preheated in a fourth individual heating zone. In some cases, at least two of the first, second, third, and fourth heating zones may be in the same pyrolysis furnace, or one or more of the first, second, third, and fourth heating zones may be in different pyrolysis furnaces. Regardless of the location of the first, second, third, and fourth heating zones, however, at least a portion of the heating of the first crucible, at least a portion of the cooling of the second crucible, at least a portion of the transferring of the third crucible, and at least a portion of the preheating of the fourth crucible can be performed simultaneously.

Pyrolysis systems of the present invention can include more than four individual heating zones and, in such cases, one or more of the other heating zones can also be operated such that a fifth (or other) crucible can be preheated, heated under pyrolysis conditions, subjected to a hold period, cooled, or transferred into or out of a fifth heating zone simultaneously with the heating of the first crucible, at least a portion of the cooling of the second crucible, at least a portion of the transferring of the third crucible, and at least a portion of the preheating of the fourth crucible as described above. In some cases, at least two, at least three, or at least four or more other crucibles may be preheated, heated under pyrolysis conditions, subjected to a hold period, cooled, or transferred into or out of other heating zones during at least a portion of the above-described process steps.

Figure 2:
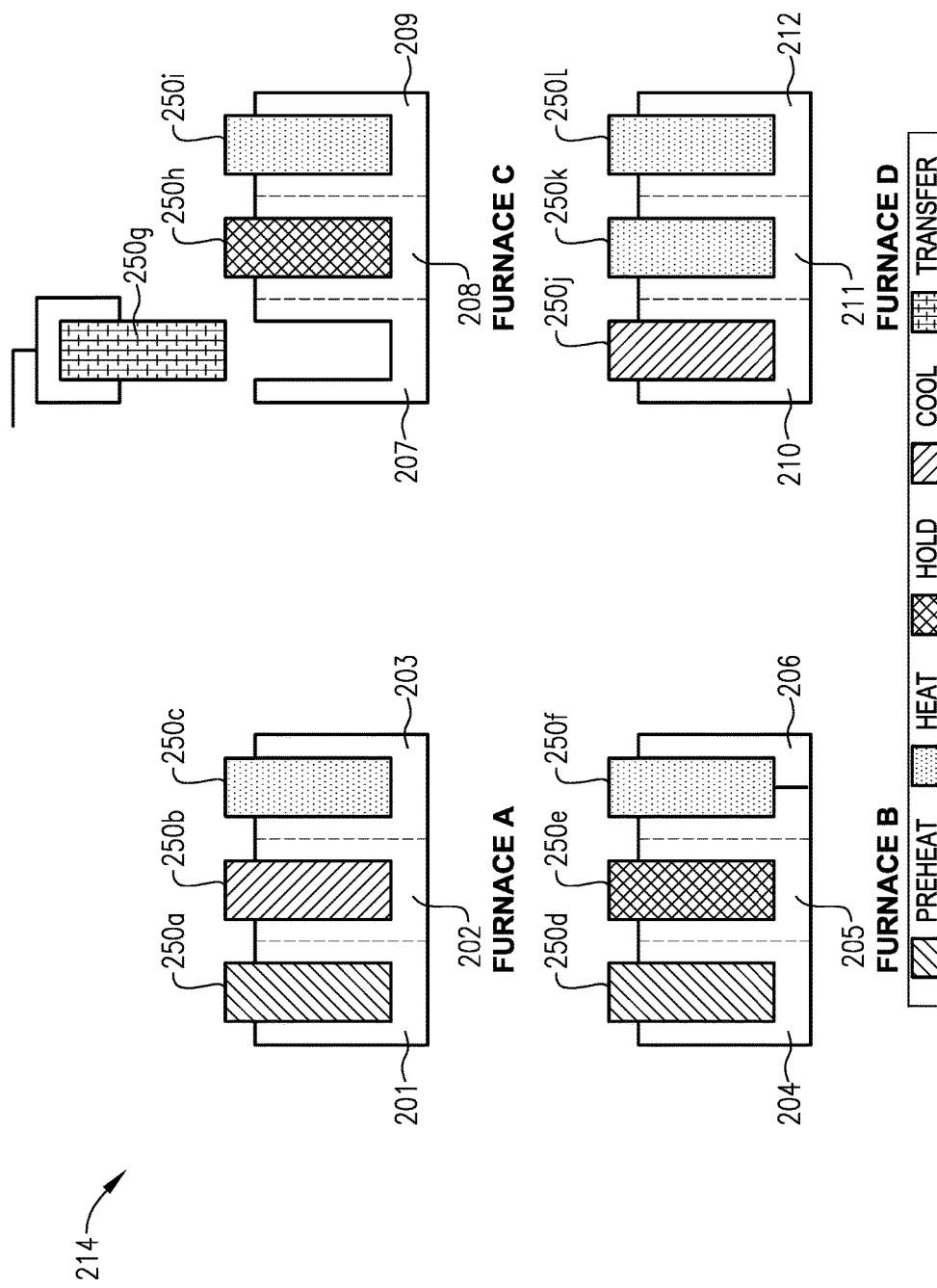
FIG. 2 is a schematic diagram of a pyrolysis zone 214 suitable for use in the pyrolysis facility 10 shown in FIG. 1, particularly illustrating the processing steps of crucibles 250a-250l during a portion of the overall heating cycle shown in FIGS. 3a-c.
Figure 3A:
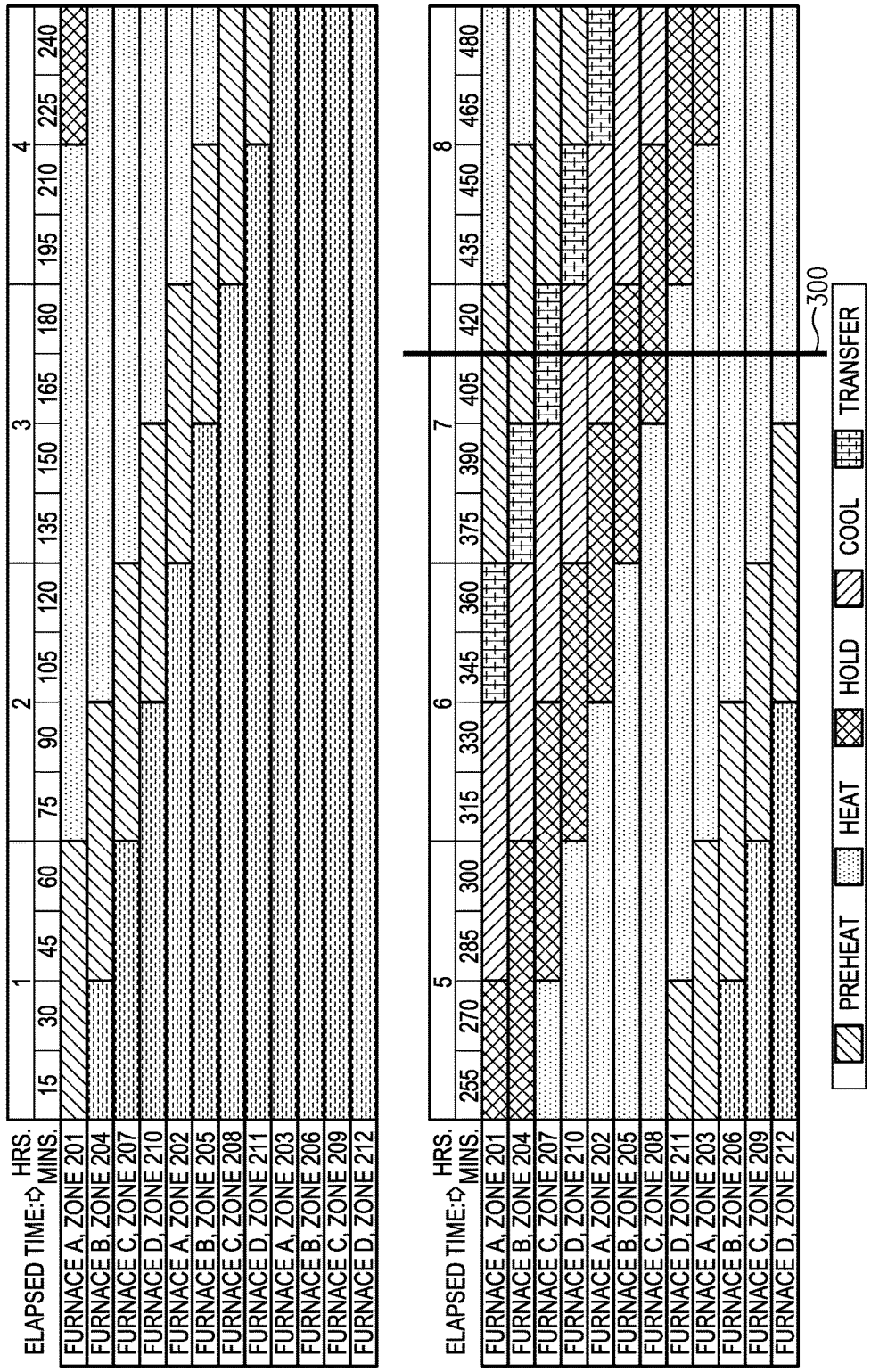
FIG. 3a is a chart illustrating the overall heating cycle of crucibles 250a-250l in the pyrolysis zone 214 shown in FIG. 2, particularly illustrating the processing steps for each of crucibles 250a-250l during the first eight hours of a 24-hour cycle.
Figure 3B:
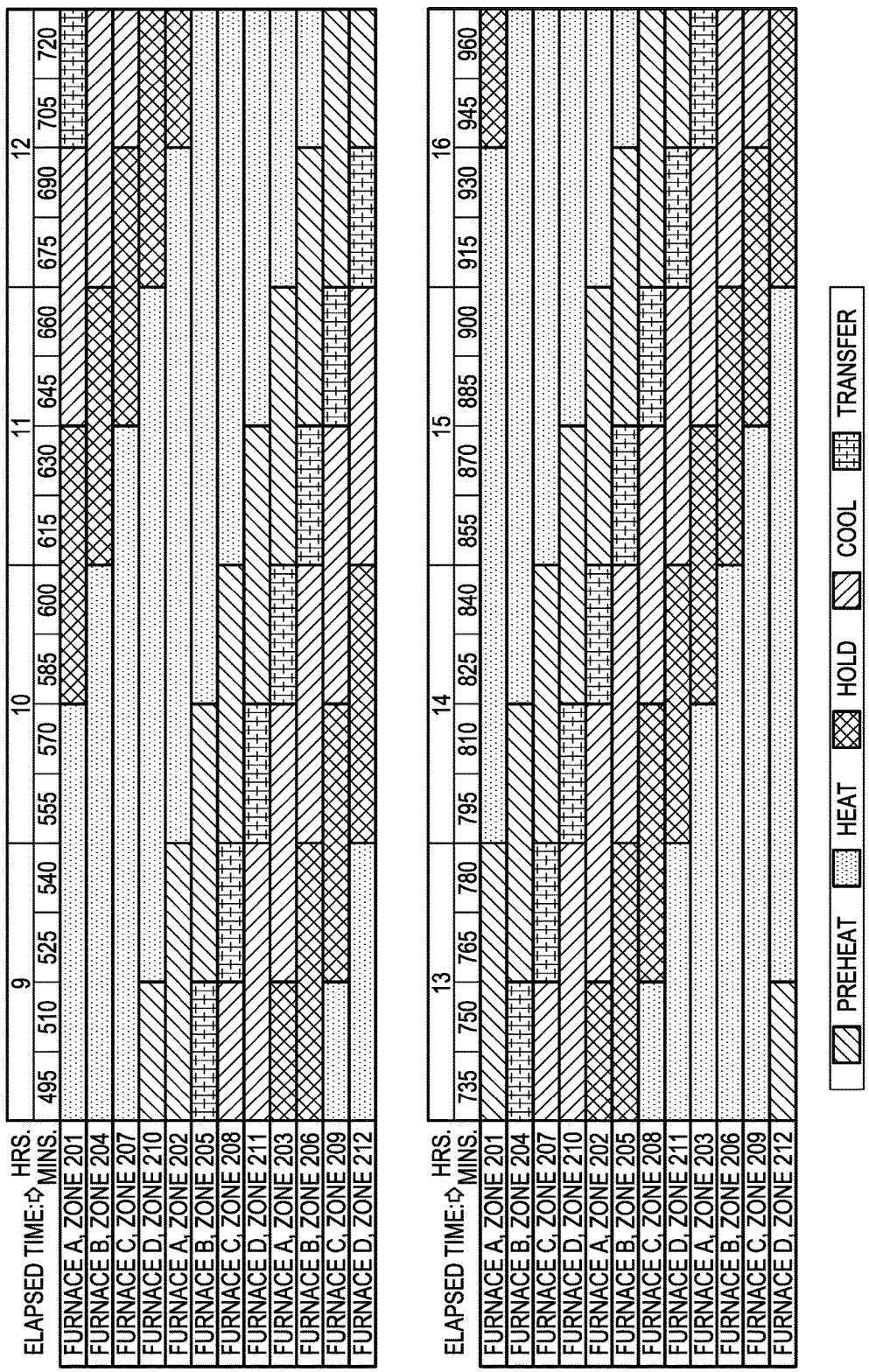
FIG. 3b is a chart illustrating the overall heating cycle of crucibles 250a-250l in the pyrolysis zone 214 shown in FIG. 2, particularly illustrating the processing steps for each of crucibles 250a-250l during the second eight hours of a 24-hour cycle.

One example of a pyrolysis zone 214 configured to operate with a sequential heating process as described above is illustrated in FIG. 2. FIGS. 3*a*-3*c* illustrate the overall cycle time of each crucible 250*a*-*l* shown in the system depicted in FIG. 2. Turning initially to FIG. 2, pyrolysis system 214, which could be utilized in pyrolysis zone 14 of facility 10 shown in FIG. 1, is illustrated as generally including four pyrolysis furnaces, shown in FIG. 2 as Furnace A, B, C, and D, that each include three individual heating zones, labeled with numerals 201-212. Each individual heating zone 201-212 of Furnaces A, B, C, and D is configured to receive one of a plurality of crucibles, shown as crucibles 250*a*-*l* in FIG. 2. It should be understood that pyrolysis system 214 may include any suitable number of additional crucibles (not shown) that may be loaded, cooled, cleaned, repaired, or otherwise processed or stored while crucibles 250*a*-*l* are being utilized in pyrolysis zone 214.

FIGS. 3*a*-*c* provide a graphical depiction of a sequential batch heating process suitable for use with Furnaces A, B, C, and D of pyrolysis system 214 shown in FIG. 2. The horizontal rows in the Table provided in FIGS. 3*a*-*c* summarize the status of the crucible in each heating 201-212 over a 24-hour period, when Furnaces A, B, C, and D are operated using a sequential heating process. Each of FIGS. 3*a*-*c* respectively depicts eight hours of the total cycle. Different overall cycle times or different durations for one or more of the individual preheating, heating, holding, cooling, and transfer stages may be used while still following similar patterns as laid out in FIGS. 3*a*-*c*.

Turning initially to FIG. 3*a*, a first crucible at least partially filled with a first quantity of pyrolyzable material, such as, for example, a rubber-containing material, may be loaded into heating zone 201 of Furnace A and preheated to initiate the entire pyrolysis cycle (at t=0). After completion of the preheating stage shown in FIG. 3*a* (at t=60 minutes), the temperature in heating zone 201 may be increased in order to pyrolyze at least a portion, or substantially all, of the pyrolyzable material within the first crucible. The pyrolysis step may be performed for any suitable period of time, such as, for example, a period of time within one or more of the ranges as described above, and upon its completion, the sealed crucible may be exposed to an autothermal pyrolysis, or "hold" period, in which the pyrolysis of the material within the first crucible is permitted to continue in the absence of addition of heat. In the example depicted in FIG. 3*a*, the pyrolysis period for the first crucible in heating zone 201 of Furnace A ends after about 2.5 hours (at t=210 minutes), and the subsequent hold period ends after about 1 hour (at t=270 minutes).

Upon completion of the hold period, the crucible in first heating zone 201 may be permitted to cool for a period of about 1 hour (at t=330 minutes) before being transferred out of heating zone 201 (at t=360 minutes). Subsequent to the removal of the first crucible from heating zone 201 of Furnace A, another crucible (not shown), at least partially filled with a pyrolyzable material may be loaded into heating zone 201 of Furnace A (at t=375 minutes) and may proceed through the entire cycle as described above. Typically, the crucible loaded into heating zone 201 to begin a heating cycle may be different than the crucible unloaded at the end of the previous cycle.

As shown in FIG. 3*a*, at least two, at least three, at least four, at least five, at least six, at least seven, or at least ten or more other crucibles may undergo similar heating cycles in one or more furnaces of pyrolysis system 214. When multiple heating cycles are performed at the same time, two or more of the cycles may be staggered relative to one another, such that crucibles in different heating zones are undergoing different portions of the cycle at the same time. For example, as shown in FIG. 3*a*, during the preheating of the first crucible in heating zone 201 (at t=30 minutes), a second crucible, at least partially filled with another quantity of pyrolyzable material, can be loaded into heating zone 204 of Furnace B and may then be preheated. Once the first crucible has been preheated to a desired pre-heat temperature (at t=60 minutes), that crucible can be further heated to a pyrolysis temperature in order to pyrolyze the quantity of pyrolyzable material therein.

At the same time, as shown in FIG. 3*a*, a third crucible, including yet another quantity of pyrolyzable material, can be loaded into heating zone 207 of Furnace C. When the second crucible in heating zone 204 of Furnace B has been preheated for a predetermined amount of time (at t=90 minutes), the second crucible may then be further heated to a pyrolysis temperature, while the third crucible in heating zone 207 is being preheated. At the same time (t=90 minutes), a fourth crucible, at least partially filled with still another quantity of pyrolyzable material, may be loaded into heating zone 210 of Furnace D, wherein it may also be preheated as shown in FIG. 3*a*.

The first four crucibles located in heating zones 201, 204, 207, and 210 of respective Furnaces A through D may then continue through the cycle as outlined in FIGS. 3*a*-*c*, while additional crucibles can be loaded into heating zones 202, 205, 208, 211, 203, 206, 209, and 212 of Furnaces A through D, and may be, respectively, preheated, pyrolyzed, subjected to a hold period, cooled, and unloaded, as described above. Thereafter, other crucibles may be loaded into the heating zones 201-212, and the cycle may be repeated, as also shown in FIGS. 3*a*-*c*. The relative status of the crucibles in two or more heating zones at a given time can be determined by drawing a vertical line from a specific time through one or more rows representing the heating zones, and comparing the status of each heating zone intersected by the line.

When pyrolysis system 214 is operated with a sequential heating process as described herein, one or more of the crucibles in each furnace may be a different point in the pyrolysis cycle, or may have a different status, than one or more other crucibles disposed in the same, or different, furnaces. For example, as shown in FIGS. 2 and 3*a*, at the time indicated by line 300 in FIG. 3*a* (t=420 minutes), crucible 250*a* disposed in heating zone 201 of Furnace A may be preheating, while crucible 250*b*, disposed in adjacent heating zone 202 of Furnace A, may be cooling, as generally shown by the shading of each of crucibles 250 shown in FIG. 2 and the shading in each corresponding row of the Table provided in FIG. 3*a*. As also shown in FIGS. 2 and 3*a*, at the same time (t=420 minutes), crucible 250*c* may be heating under conditions sufficient to pyrolyze the material disposed therein in heating zone 203 of Furnace A.

Similarly, at the same time crucibles 250*a*-*c* are preheating, cooling, and being heated under pyrolysis conditions, respectively, in Furnace A, crucibles 250*d*-*f* may be preheating, holding, and heating in respective heating zones 204-206 of Furnace B. In some cases, at least one crucible may be in the process of being transferred into or out of a heating zone while one or more other crucibles are being processed, as shown by Furnace C in FIG. 2. In Furnace D, crucible 250*j* can be cooling in heating zone 210, while one or both of crucibles 250*k* and 250*l* may be subjected to pyrolysis in heating zones 211 and 212.

In some cases, one or more crucibles 250*a-l* may be undergoing a similar processing step at a given time, although neither crucible may be at the exact same point of its overall cycle as the other. For example, crucibles 250*k* and 250*l* are shown in FIG. 2 as each undergoing pyrolysis, although, as shown in the example depicted in FIG. 3*a*, crucible 250*k* can be further along in its pyrolysis stage than crucible 250*l*.

Although shown in FIGS. 2 and 3*a-c* as having four furnaces with three heating zones each, cases exist in which pyrolysis zone 214 employs more or fewer furnaces each having more or fewer heating zones. Operation of such systems would be similar to the operation of pyrolysis system 214 described previously, but adjusted to accommodate the exact number of furnaces and heating zones. By following the cycle times and sequence as shown in FIGS. 3*a-c*, the pyrolysis system 214 depicted in FIG. 2 could process 48 crucibles in a 24 hour period, while providing continuous and generally steady flow of hydrocarbon vapor to the downstream separation zone (not shown in FIG. 2). In some cases, the pyrolysis system 214 depicted in FIG. 2, or a similar system, may be configured and operated to process at least 25, at least 35, at least 45, at least 50 or more crucibles in a 24-hour period.

Referring again to FIG. 1, the hydrocarbon vapor withdrawn from the crucibles during pyrolysis in pyrolysis zone 14 may be collected in one or more collection headers and passed to a separation zone 16, as discussed previously. Separation zone 16 can include any steps or equipment needed to process the pyrolysis vapor and provide desirable pyrolysis product streams. For example, separation zone 16 may include one or more cooling and/or separation stages suitable for condensing and separating at least a portion of the heavier hydrocarbon components from the pyrolysis vapor stream to thereby form a pyrolysis gas, or "pygas," stream in line 118 and at least one pyrolysis oil stream in line 120.

Figure 4:
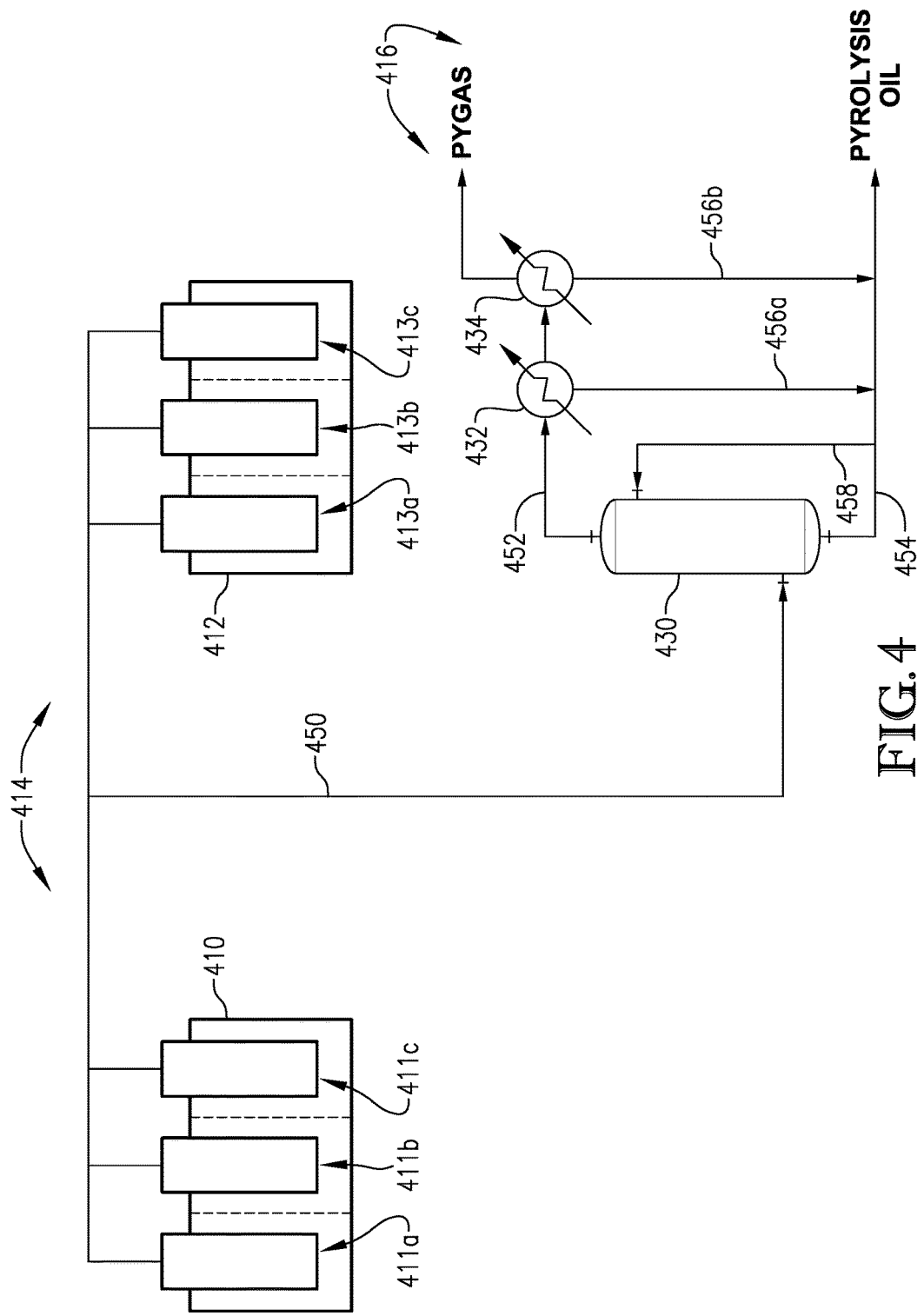
FIG. 4 is a schematic diagram of an exemplary pyrolysis zone 414 and a separation zone 416 suitable for use in pyrolysis facility 10, particularly showing the use of a single separation zone to process pyrolysis vapor from multiple crucibles heated in more than one pyrolysis furnace.

Turning to FIG. 4, one example of a pyrolysis zone 414 and a downstream separation zone 416 are shown. As shown in FIG. 4, pyrolysis zone 414 includes two pyrolysis furnaces 410 and 412, which each include three individual heating zones 411*a-c* and 413*a-c*. The pyrolysis vapor phase withdrawn from each of the crucibles disposed in individual heating zones 411*a-c* and 413*a-c* can be collected in a single manifold, or collection header, 450 before being introduced into separation zone 416. Optionally, collection header 450 may be an insulated collection header that does not permit condensation of pyrolysis vapor as the vapor travels from furnaces 410 and 412 to separation zone 416. Although shown in FIG. 4 as including two furnaces, as discussed above, pyrolysis zone 414 may include a single furnace, or may include three or more furnaces, each configured to provide pyrolysis vapor to separation zone 416. Further, although shown as including a single separation zone 416, the portion of the pyrolysis system shown in FIG. 4 may also include two or more separation zones, each optionally configured to handle pyrolysis vapor from one furnace or from two or more furnaces present in pyrolysis zone 414. For example, in some cases, pyrolysis zone 414 may include four pyrolysis furnaces each feeding a single separation zone, or it may include two or more separation zones, which are each configured to receive vapor from two or more furnaces (not shown).

As shown in FIG. 4, separation zone 416 can include a vapor-liquid separation vessel 430 and a pair of coolers 432 and 434. The hydrocarbon vapor collected in collection header 450 may be introduced into separator 430, wherein it can be separated into a vapor-phase overhead stream in line 452 and a liquid bottoms stream in line 454. As shown in FIG. 4, the vapor-phase overhead stream in line 452 withdrawn from separator 430 can be sequentially cooled and at least partially condensed in coolers 432 and 434. The condensed portion of the stream removed from coolers 432 and 434 in respective lines 456*a* and 456*b*, can optionally be combined with the bottoms liquid product stream withdrawn from separator 430 in line 454 to form a stream of liquid pyrolysis oil. Alternatively, one or more of the liquid bottoms stream in line 454, the liquid from condenser 432 in line 465*a*, and the liquid from condenser 434 in line 456*b* may not be combined, as shown in FIG. 4, but may be separately recovered from separation zone 416 as an individual product stream. The uncondensed hydrocarbon vapor withdrawn from cooler 434 may be passed through a knock-out pot and filter (not shown) before being withdrawn from separation zone 16 as a pyrolysis gas product stream. Optionally, all or a portion of the pyrolysis oil recovered from separation zone 416 may be sent to a downstream separation unit or zone (not shown) for further separation or other processing prior to its storage, transportation, use, and/or sale.

Separator 430 may be any suitable type of vapor-liquid separator and, in some cases, may employ an internal liquid stream for contacting at least a portion of the pyrolysis vapor within the separator in order to facilitate direct heat and mass transfer between the two phases. In the example shown in FIG. 4, separator 430 is a scrubber column that employs a portion of the bottom liquid stream in line 458 to contact the ascending vapor at one or more points in the column. Separator 430 may optionally include internals, such as trays, structured packing and/or random packing, or it may be substantially empty. Separator 430 may be operated under any temperature and/or pressure suitable to perform the desired separation.

Referring again to FIG. 1, the pyrolysis oil withdrawn from separation zone 16 in line 120 may optionally be passed to another separation zone 26 for additional separation and/or further treatment. For example, in separation zone 26, the pyrolysis oil may be further separated in one or more vapor-liquid separation columns, including scrubbers and/or distillation columns, in order to provide additional liquid product streams. Examples of additional liquid products that can be produced by further separation of pyrolysis oil can include, but are not limited to, light naphtha, heavy naphtha, gasoline-range oil, diesel-range oil, or heavier liquid residue oils. One or more of these product streams may be optionally stored before being otherwise used or sold.

As shown in FIG. 1, at least a portion, or all, of the pygas stream withdrawn from separation zone 16 in line 118 may be used as fuel for one or more furnaces (not shown in FIG. 1) in pyrolysis zone 14. When reused as fuel gas, the pygas stream may pass through one or more compressors (not shown) prior to entering pyrolysis zone 14. In addition to the pygas, the pyrolysis zone 14 may also utilize natural gas or other gas fuel source and, optionally, may be configured to utilize a liquid fuel. In some cases, the pyrolysis furnaces in pyrolysis zone 14 may be configured to utilize only gas fuel and can be configured to burn both pygas and natural gas, separately or in combination. When pygas is used as a fuel, it may be used in a volume sufficient to provide at least about 30 percent, at least about 35 percent, at least about 40 percent, at least about 45 percent, at least about 50 percent, or at least about 55 percent of the total energy requirement for operating the pyrolysis furnaces. In some cases, this may require use of at least about 75, at least about 80, at least about 85, at least about 90, or at least about 95, or substantially all of the pygas produced from separation zone 16 as fuel. Any pygas not utilized as fuel in pyrolysis zone 14 may optionally be stored before being otherwise used or sold.

Turning again to the pyrolysis zone 14 shown in FIG. 1, crucibles that have completed the full pyrolysis cycle as described above can be transferred out of the furnace and into a cooling and holding zone 28, as shown in FIG. 1. The transfer device used to transport the crucibles can be any suitable device and may, for example, be the same overhead crane lift or other device used to load the crucibles into the furnace. A forklift with gripping arms or other similar transfer device may also be used. Once transported to cooling and holding zone 28, the sealed crucibles may be permitted to cool to a temperature of not more than about 300° F., not more than about 250° F., not more than about 200° F., or not more than about 150° F., at which point the cover of the crucible can be removed without combustion of the carbonaceous material therein. Overall, the cooling time of a single crucible in cooling and holding zone 28 can be at least about 6 hours, at least about 8 hours, at least about 10 hours, or at least about 12 hours and/or not more than about 20 hours, not more than about 18 hours, not more than about 16 hours, or not more than about 14 hours.

Once cooled, the cover of the crucible can be loosened and removed after the internal pressure of the crucible is vented. The cover may be removed by, for example, unbolting it from the crucible and removing the cover via a transfer device such as an overhead crane lift system. In some cases, the lift system can be the same system used in securing the cover onto the crucible and in loading and/or unloading the sealed crucibles into and out of the furnace. The cover can be removed, cleaned, repaired as needed, and stored for subsequent reuse.

The unlidded crucible may then be transported to solids processing zone 18, as shown by line 124 in FIG. 1, via forklift equipped with a hydraulic rotator, or other similar device. In solids processing zone 18, the residual pyrolysis solids can be removed from the crucible in a solids transfer, or "dumping," zone 30 before being further cooled in cooling zone 32. The resulting cooled solid material may then be separated into its various component parts in solid separation zone 34, and one or more of the resulting separated materials may be packaged or loaded into storage containers in a loading zone 36 before being transported out of facility 10 for further use, sale, and/or recycle.

Prior to transporting the crucible to solids processing zone 18, the solid contents of the crucible may be visually inspected, or otherwise tested. Visual inspections may evaluate the pyrolysis solids for signs of unfinished pyrolysis, such as, for example, large unpyrolyzed tire pieces or a clumpy or sticky consistency of the solid material. Additional tests may also be used to determine the value for one or more properties of the pyrolysis solids, and, if outside a predetermined range for that value, the crucible and its contents may be returned to filling zone 22, as shown by the dashed line 130 in FIG. 1.

Unlike systems that utilize a continuous pyrolysis process, which cannot process recycled pyrolysis solids, pyrolysis facility 10 shown in FIG. 1 may receive and heat rubber-containing material found to be not fully pyrolyzed after a heating cycle. In some cases, the recycled, at least partially unpyrolyzed material may be directly returned and re-pyrolyzed in the same crucible, while, in other cases, the unpyrolyzed rubber-containing material may be transferred to another crucible for subsequent heating. Optionally, the returned pyrolysis solids may be combined, in the same or a different crucible, with fresh rubber-containing material, or "fresh feed," and/or with at least partially unpyrolyzed rubber-containing material from one or more other batches of returned pyrolysis solids before being heated again in pyrolysis zone 14.

In some cases, at least about 40 percent, at least about 50 percent, at least about 60 percent, at least about 70 percent, at least about 80 percent, at least about 90 percent, or at least about 95 percent of the total weight of pyrolysis solids in one or more crucibles, can be returned to pyrolysis zone 14 for further heating. Or, in other cases, all of the pyrolysis solids may be returned to pyrolysis zone 14 for further heating. In other cases, only a portion of the pyrolysis solids, such as, for example, less than about 40 percent, less than about 30 percent, less than about 25 percent, less than about 20 percent, less than about 15 percent, less than about 10 percent, or less than about 5 percent of the total weight of pyrolysis solids may be returned to pyrolysis zone 14 for further heating. Of the returned pyrolysis solids, at least about 10 percent, at least about 20 percent, at least about 30 percent, at least about 40 percent, at least about 50 percent, at least about 60 percent, at least about 70 percent, or at least about 80 percent can be unpyrolyzed rubber-containing material, with the remaining solids being carbon black or other pyrolyzable or unpyrolyzable materials.

As discussed above, the pyrolysis solids returned to pyrolysis zone 14 may be subjected to a further pyrolysis step in the same crucible, or a different crucible than the one in which the solids were initially heated, and may optionally be combined with fresh rubber-containing material and/or other quantities of returned pyrolysis solids to form a pyrolyzable mixture. In some cases, at least about 5 weight percent, at least about 10 weight percent, at least about 20 weight percent, at least about 30 weight percent, at least about 40 weight percent, at least about 50 weight percent, at least about 60 weight percent, at least about 70 weight percent, or at least about 80 weight percent of the pyrolyzable mixture may comprise returned pyrolysis solids from one or more crucibles. In other cases, less than about 20 weight percent, less than about 15 weight percent, less than about 10 weight percent, or less than about 5 weight percent of the pyrolyzable mixture may comprise fresh rubber-containing material.

In some cases, the weight of the returned pyrolysis solids in the pyrolyzable mixture, as compared to the weight of the fresh rubber-containing material, can be at least about 5 percent, at least about 10 percent, at least about 15 percent, at least about 20 percent, at least about 25 percent, at least about 30 percent, at least about 40 percent, at least about 50 percent, at least about 60 percent, or at least about 75 percent greater (if the weight of returned pyrolysis solids is higher than the weight of fresh rubber-containing material in the pyrolyzable mixture) or less (if the weight of the returned pyrolysis solids is lower than the weight of fresh rubber-containing material in the pyrolyzable mixture), based on the total weight of the fresh rubber-containing material. That is, the value of the following equation can be within one or more of the ranges above: (weight of returned pyrolysis solids–weight of fresh rubber-containing material)/(weight of fresh rubber-containing material), expressed as a percent.

After the initial pyrolysis of a rubber-containing material, the determination of whether or not all or a portion of the pyrolysis solids require further processing may be made by measuring at least one property of the pyrolysis solids, comparing the measured value of the property to a target value for that property to determine a difference, and, based on that difference, returning all or a portion of the pyrolysis solids to pyrolysis zone 14 for further processing. The target value with which the measured value is compared may be a minimum target value, a maximum target value, or a range of values that includes a lower end point value and an upper end point value. If the difference between the measured value and the target value is greater than a predetermined amount, such as, for example, 2 percent, 5 percent, or 10 percent, based on the target value, then at least a portion of the pyrolysis solids may be returned to the pyrolysis zone for reprocessing. For example, if the property being measured was iodine number, the target value was minimum iodine number of 120 g/kg, and the predetermined amount was 2 percent, a batch of pyrolysis solids having a measured value for iodine number of 114 g/kg or less would be returned to the pyrolysis zone for further processing. In the above example, an iodine number of 114 g/kg is 2 percent lower than the minimum iodine number of 120 g/kg (e.g., 120 g/kg×0.02=6 g/kg and 120 g/kg–6 g/kg=114 g/kg) and, therefore, any batches of pyrolysis solids having an iodine number of 114 or less would be returned for further pyrolysis.

Examples of other properties of the pyrolysis solids that may be measured in order to determine whether or not to return all, or a portion, of the pyrolysis solids to pyrolysis zone 14 can include, but are not limited to, those described in ASTM D1765-14, "Standard Classification System for Carbon Blacks Used in Rubber Products," which is incorporated herein by reference. More particularly, in some cases, the property of the pyrolysis solids used to determine whether or not all or a portion of the solids are returned can be selected from the group consisting of nitrogen surface area (ASTM D-6556), oil absorption number (ASTM D-3493), iodine absorption number (ASTM D-1510), ash content (ASTM D-1506), heat loss (ASTM D-1509), tint strength (ASTM D-3265), pour density (ASTM D-1513), sieve residue (ASTM D-1514), toluene discoloration (ASTM D-1618), fines content (ASTM D-1508), delta modules (ASTM D-3192), and combinations thereof.

The step of measuring a property of the pyrolysis solids can be done visually, manually, or using an automatic sampling or testing system. In some cases, the measuring step can include measuring at least one value for two or more different properties, or it may include measuring more than one value for a single property. In the former case, the values can be compared to a target value for each property to determine a difference for each property, and, in the latter case, the each of the values can be compared with a target value for that property to determine two or more differences. In either case, if one or more of the differences (or, if multiple differences are measured, the average of all of the differences determined) is greater than a predetermined amount, such as, for example, at least 2 percent of the target value, then all or a portion of the pyrolysis solids may be returned to the pyrolysis zone for further heating as described above.

Figure 5:
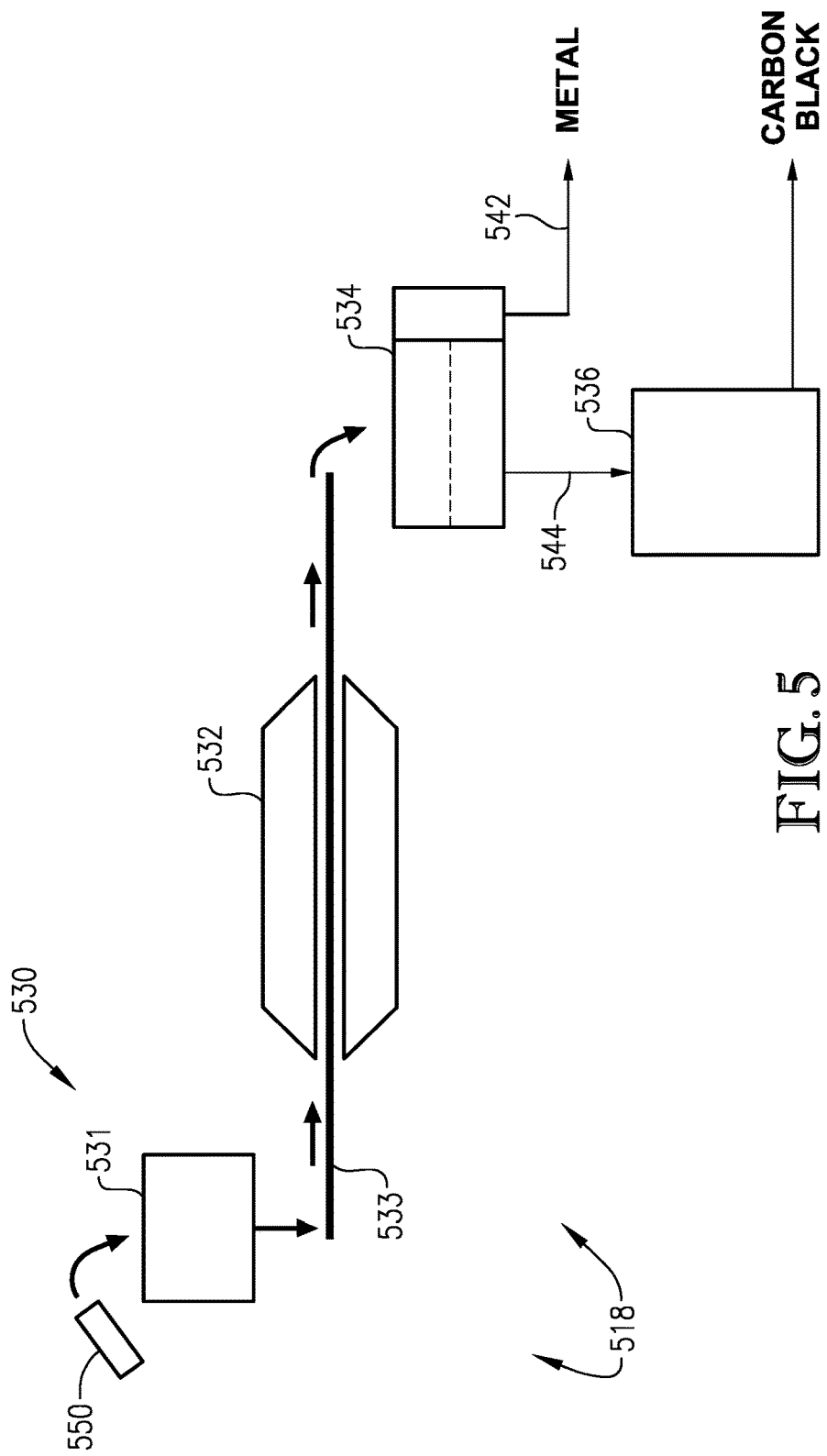
FIG. 5 is a schematic diagram of an exemplary solids processing system 518 suitable for use in pyrolysis facility 10 shown in FIG. 1, particularly illustrating various areas of the solids processing zone 518 and the relationships between these areas.

Turning now to FIG. 5, one example of a solids processing system 518 is provided. Solids processing system 518 is illustrated as including a dumping zone 530, a hopper 531, a transfer device 533, a cooling zone 532, a solid separation zone 534, and a carbon black loading zone 536. As shown in FIG. 5, once transported to dumping zone 530, a crucible 550 may be inverted to that its contents can be dumped into hopper 531. When the feedstock pyrolyzed in the upstream pyrolysis zone includes a rubber-containing material, such as tires, the residual solid material can include granular carbonaceous material, or "carbon black," along with residual steel wires and other metallic or otherwise non-pyrolyzable components. In some cases, when the pyrolysis zone (not shown) is configured to process two or more crucibles simultaneously, the emptying of individual crucibles into hopper 531 may be staggered in order to provide a steady flow of solid material into solids processing system 518. Solids processing system 518 can be operated in a batch, semi-batch, or semi-continuous manner.

The residual solid material dumped from the crucible into the hopper 531 may be metered and transferred to cooling zone 532, via a transfer device 533, shown in FIG. 5 as a conveyor. The transfer device 533 may include, for example, a vibrating conveyor or other similar device, and/or having a variable frequency drive to control the speed and an amplitude adjustment to control the vibration level. In order to control the flow of solids into cooling zone 532, transfer device 533 may be configured to deliver the contents of a crucible, or the entire hopper, over a predetermined period of time. For example, transfer device 533 may be operated to transport the solid contents of one crucible to cooling zone 532 over a period of at least about 10 minutes, at least about 15 minutes, at least about 20 minutes and/or not more than about 45 minutes, not more than about 40 minutes, not more than about 35 minutes, or not more than about 30 minutes. In so doing, the flow of solid material to cooling zone 532 may be steady and nearly continuous.

In cooling zone 532, the residual solid material may be further cooled by any suitable device. In cooling zone 532, the temperature of the solids may be reduced to not more than 120° F., not more than about 110° F., not more than 100° F., or not more than 75° F. In some cases, a fluidized bed cooler may be used in cooling zone 32 and may be configured to pass a stream of air or other gas, such as nitrogen, over the solid material as it passes through fluidized bed cooler 532. The air may be passed perpendicular to, or parallel but counter-current to, the material passing through cooling zone 532. The resulting cooled material exiting cooling zone 532 may be transported via transfer device 533 into an inlet of solid separation zone 534, as shown in FIG. 5.

Solid separation zone 534 may include any equipment or process suitable for separating out various components of the residual solid material transported from cooling zone 32. When the residual solid material includes pyrolysis solids, solid separation zone 34 may be configured to separate carbon black from the metallic elements, such as steel wire. In such a case, separation zone 34 may include a vibrating separator for sifting the carbon black powder from the metal pieces, followed by, for example, an inclined conveyor belt equipped with one or more magnetic elements, such as, for example, a magnetic head pulley, for separating the rest of the metal. The metal elements collected from the separator and conveyor belt may be removed from solid separation zone 534 as shown by line 542 and optionally stored prior to further use, recycle, or sale.

The cooled, screened carbon black material from solid separation zone 534 may be passed to a carbon black loading zone 536 as shown by line 544, wherein the material may be loaded into one or more storage containers for further use, storage, and/or sale. Optionally, prior to loading the carbon black, at least a portion of the material may be ground in a grinding zone (not shown) to provide particles of smaller and/or more consistent particle size. In addition, or the alternative, the carbon black may be subjected to one or more additional chemical and/or physical treatment steps before being introduced into loading zone 536.

In some cases, loading zone 536 may include a surge hopper (not shown) to provide sufficient time for loading and unloading storage containers in loading zone 536. Examples of suitable storage containers can include, but are not limited to, drums, totes, bags, sacks, supersacks, or combinations thereof. Optionally, the carbon black can be loaded into a tared storage container while disposed on a scale in order to provide a loaded container having a desired weight. The total weight of the loaded storage containers can be at least about 5 pounds, at least about 10 pounds, at least about 20 pounds, at least about 50 pounds, at least about 100 pounds, at least about 150 pounds, at least about 200 pounds, at least about 250 pounds, at least about 400 pounds, at least about 500 pounds, at least about 750 pounds, or at least about 1000 pounds. Samples of the material may be removed from the loaded containers for analysis of the product prior to being transported from the facility for further processing, storage, use, and/or sale.

During one or more steps of the process conducted in solids processing zone 18 of pyrolysis facility 10 shown in FIG. 1, at least a portion of the pyrolysis solids may be dispersed or emitted into the surrounding environment during processing. More particularly, at least a portion of the carbon black fines or other material may be emitted during the surrounding environment during at least a portion of the dumping, cooling, separating, and/or loading of pyrolysis solids described in detail previously. As used herein, the term "fines" refers to particles having an average size of 150 microns or less. In some cases, however, at least a portion of the carbon black fines may be smaller. For example, at least about 50 weight percent, at least about 60 weight percent, at least about 70 weight percent, at least about 75 weight percent, at least about 85 weight percent, or at least about 90 weight percent of a sample of carbon black fines can have an average particle size of less than 100 microns. In some cases, at least 50 weight percent of a sample of carbon black fines can have an average particle size less than about 95 microns, less than about 85 microns, less than about 75 microns, less than about 65 microns, or less than about 50 microns.

To capture and remove at least a portion of the fines from the environment, pyrolysis facility 10 and, more specifically, solids processing zone 18, shown in FIG. 1 may further include a dust collection, or fines capturing, system for capturing at least a portion of the airborne carbon black fines generated during the dumping, cooling, separating, and/or loading steps. One or more dust collection zones, independently or collectively operated as a dust collection or fines capturing system, may be configured to remove at least a portion, or all, of the airborne carbon black fines to provide a substantially dust-free environment. Upon capture by and collection in the dust collection system, at least a portion of the carbon black fines may be loaded into one or more storage containers, either in combination with or in addition to, the carbon black being loaded into storage containers in loading zone 36, whereupon the collected fines may be further processed, disposed of, stored, and/or sold.

The specific configuration of the dust collection system utilized in solid processing zone 18 of pyrolysis facility 10 may vary, depending on the specific location or locations within solids processing zone 18 in which it is used. In some cases, the dust collection system may be present in or around one or more of solids transfer zone 30, cooling zone 32, separation zone 34, and loading zone 36. Any suitable equipment configured to capture and remove at least a portion of the carbon black, or other fines, from the surrounding environment may be used.

Figure 6:
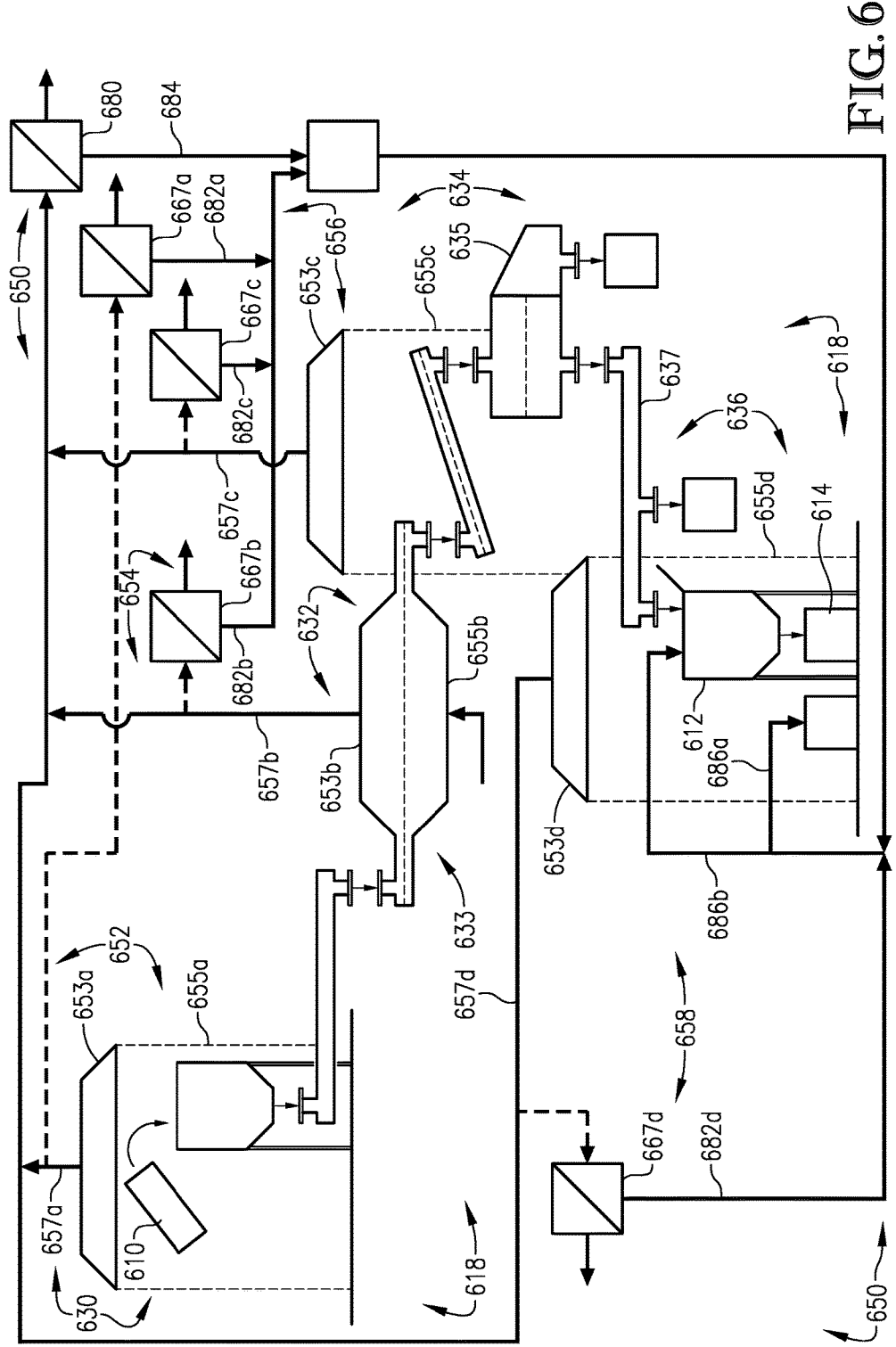
FIG. 6 is a schematic diagram of an exemplary solids processing system 618 suitable for use in pyrolysis facility 10 shown in FIG. 1, particularly illustrating one example of a dust collection system 650 and its related components.

One example of a dust collection system 650 is illustrated in FIG. 6. The exemplary dust collection system 650 depicted in FIG. 6 can be configured to capture at least a portion of the carbon black, or other type of, fines emitted from one or more steps performed in a solids processing zone 618. Dust collection system 650 of solids processing zone 618 depicted in FIG. 6, is one example of dust collection system that may be utilized in, for example, solids processing zone 18 of pyrolysis facility 10 shown in FIG. 1. As shown in FIG. 6, solids processing zone 618 includes a solids transfer zone 630, a solids cooling zone 632, a solids separation zone 634, and a loading zone 636. Optionally, solids processing zone 618 may also include a grinding zone (not shown) for reducing the particle size of the carbon black material after separation but before loading. The operation of zones solids transfer zone 630, cooling zone 632, separation zone 634, and loading zone 636 of solids processing zone 618 shown in FIG. 6, are similar to those analogously numbered components described above with respect to FIGS. 1 and 5.

In the exemplary solids processing system 618 shown in FIG. 6, solids cooling zone 632 comprises a fluidized bed cooler 633, and solids separation zone 634 includes a screen separator 635 for separating carbon black from metallic components as well as a belt conveyor 637 including a magnetized element (not shown) for removing any residual metallic elements from the carbon black prior to its introduction into loading zone 636. Other cooling and/or separating devices may be utilized in solids cooling zone 632 and/or solids separation zone 634 without departing from the present invention.

The exemplary dust collection system 650 depicted in FIG. 6 includes a first dust collection zone 652, a second dust collection zone 654, a third dust collection zone 656, and a fourth dust collection zone 658, each configured to capture at least a portion of the carbon black fines emitted from one or more process areas of solids processing zone 618. More particularly, as shown in the exemplary system depicted in FIG. 6, the first, second, third, and fourth dust collection zones 652, 654, 656, and 658 are respectively configured to capture at least a portion of the carbon black fines emitted within solids transfer zone 630, solids cooling zone 632, solids separation zone 634, and loading zone 636. Optionally, dust collection system 650 may include a fifth dust collection zone (not shown) configured to capture at least a portion of the carbon black fines emitted from a grinding zone, when present. Other configurations may also be suitable, and can, for example, include two or more of the individual dust collection zones 652, 654, 656, and 658 merged into a single, larger dust collection zone capable of collecting at least a portion of the carbon black fines emitted from two or more process areas of solids processing zone 618 simultaneously. Each of dust collection zones 652, 654, 656, and 658 may be operated independently, or two or more may be operated collectively.

Any suitable type of dust collection device may be used and the specific dust collection device utilized in one or more of dust collection zones 652, 654, 656, and 658 may the same or different than one or more of the other dust collection zones 652, 654, 656, and 658. In some cases, one or more of dust collection zones 652, 654, 656, and 658 may include a hood, examples of which are schematically shown as hoods 653a-653d in FIG. 6, and, optionally, an enclosure, shown schematically as enclosures 655a-d in FIG. 6. The hood can be any suitable type of device for at least partially isolating a portion of the process area, while being configured to receive and remove a stream of gas and particles from the area. Examples of suitable enclosures include, but are not limited to, walls, screens, buildings, curtains such as plastic curtains, and the like. In some cases, enclosures 655a-c may encompass at least 1, at least 2, at least 3, or all 4 sides of a portion, or all, of a processing area. When both are present, the enclosure may be in contact with, or proximate to, its respective hood, as shown by the exemplary hoods 653a, 653c, and 653d and enclosures 655a, 655c, and 655d in FIG. 6, or, in some cases, the enclosure may be integral with all, or a portion of, the hood, as shown by hood 653b and enclosure 655b illustrated in FIG. 6. In some cases, all or a portion of the loading equipment present in loading zone 636, such as, for example, the loading line between the hopper 612 and the storage container 614 (not shown), may be at least partially enclosed with one or more dust evacuation conduits for removing emitted carbon black particles from loading zone 636.

In some cases, one or more of dust collection zones 652, 654, 656, and 658 may utilize a stream of pressurized fluid, such as air or nitrogen, passed through the enclosure 655a-d in order to capture, via entrainment, at least a portion of the carbon black fines emitted into the surrounding environment. The pressurized fluid may be a gas, such as nitrogen or air, discharged from a compressor or other pressurization device (not shown) and through the enclosure, or it may be a stream of water or other suitable liquid used to dis-entrain at least a portion of the carbon black fines in the surrounding environment. In some cases, one or more of dust collection zones 652, 654, 656, and 658 may include a vacuum pump (not shown) for creating a region of sub-atmospheric pressure within the dust collection zone 652, 654, 656, or 658, thereby removing a portion of the particulate-laden air surrounding the equipment in the process zone. Upon removal from the enclosure and/or hood, the stream of fluid may be passed through at least one filter device configured for removing the captured particles from the fluid stream. In some cases, each of dust collection zones 652, 654, 656, and 658 may have its own filter device, as shown by filter devices 667a-d in FIG. 6, or, each of dust collection zones 652, 654, 656, and 658 may share a common filter device, illustrated as filter device 680 shown in FIG. 6. In some cases, two or more dust collection zones 652, 654, 656, and 658 may share a filter device, while one or more dust collections zones 652, 654, 656, and 658 may have its own filter device.

Any suitable type of filter device can be used, including, but not limited to, cartridge filters, bag filters, basket filters, electrostatic precipitators, and combinations thereof. Although shown in FIG. 6 as including a single unit, each of filter devices 667a-d or filter device 680 may include two or more filter devices arranged in parallel or in series. Each of filter devices 667a-d or filter device 680 may be configured to separate particles having an average particle size of less than about 150 microns, less than about 100 microns, less than about 75 microns, or less than about 50 microns. The overall separation efficiency of one or more of filtration devices 667a-d or 680 may be at least about 50 percent, at least about 60 percent, at least about 70 percent, at least about 75 percent, at least about 80 percent, at least about 85 percent, at least about 90 percent, or at least about 95 percent. The overall separation efficiency of one or more of filter devices 667a-d or 680 may be defined by the following equation: (mass of solid particles in filter effluent−mass of solid particles in filter feed)/(mass of solid particles in filter feed), expressed as a percent.

As shown by lines 682a-d and line 684 in FIG. 6, the captured carbon black fines separated from the gas stream in each of filter devices 667a-d and 680, respectively, can be transported to loading zone 636, wherein the fines may be loaded into a storage container via line 686a or may be combined with the carbon black product as it is loaded into one or more storage containers via line 686b. When combined with a carbon black product, less than about 15, less than about 12, less than about 10, less than about 8, less than about 7, less than about 5, or less than about 2 weight percent of the total carbon black product in the storage container 614 may comprise carbon black fines, captured by dust collection system 650 and routed to loading zone 636 as described above. On average, the dust collection system or systems utilized by pyrolysis facility 10 can be configured to collect at least 0.10 pounds, at least 0.25 pounds, at least 0.5 pounds, at least 1 pound, at least 1.5 pounds, or at least 2 pounds, at least 5 pounds, or at least 10 pounds of carbon black fines per day, averaged over a 30-day period.

Overall, pyrolysis facility 10 shown in FIG. 1 can have an average daily feed rate, measured and averaged over a 30-day period, of at least about 10 tons per day, at least about 12 tons per day, at least about 15 tons per day, at least about 17 tons per day, or at least about 20 tons per day. That is, pyrolysis facility 10 shown in FIG. 1 may be capable of processing at least about 10 tons per day, at least about 12 tons per day, at least about 15 tons per day, at least about 17 tons per day, or at least about 20 tons per day of feed, averaged over a 30-day period. To achieve this rate, pyrolysis facility 10 can employ any number of crucibles and may, for example, employ at least about 4 crucibles, at least 5 crucibles, at least 10 crucibles, at least 15 crucibles, at least 20 crucibles, or at least 25 crucibles, or more.

The specific amount of at least one, or each, type of product, including pygas, pyrolysis oil, carbon black, and metallic elements, may be adjustable and can depend, for example, on the type of feedstock and the operating conditions within the facility. As used herein, the term "daily production rate" refers to the mass or volume of a given product produced per day within the facility, averaged over a 30-day period, while the "per-batch production rate," refers to the mass or volume of a given product produced per batch (or, in some cases, per crucible), averaged over the total batches in a 1-week period. As used herein, the term "percent yield" of a given product refers to the weight percent of a given product in a specific batch divided by the total weight of feed for that batch, expressed as a percent.

Figure 7:
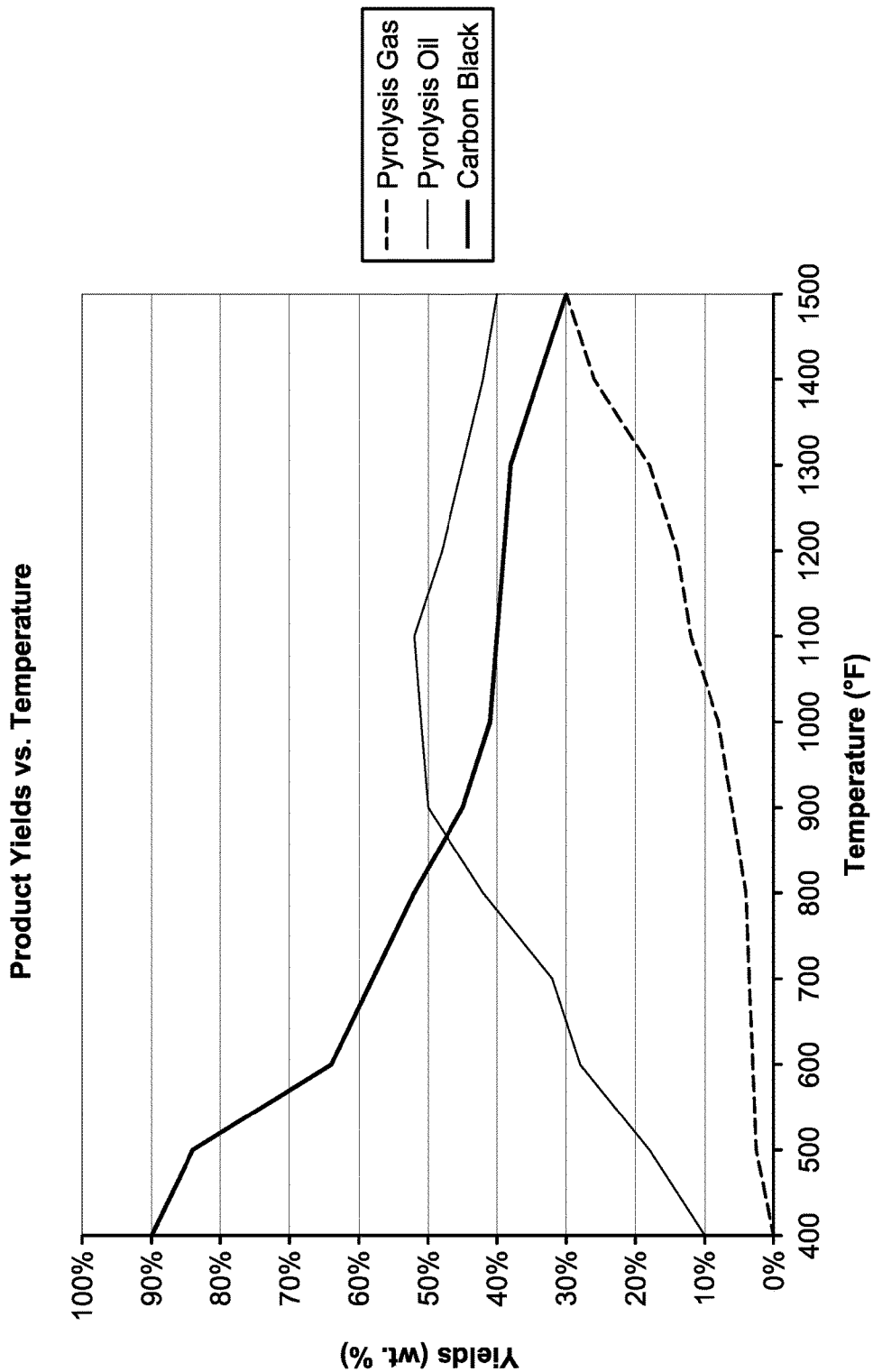
FIG. 7 is an exemplary yield curve, particularly showing the yield of pyrolysis gas, pyrolysis oil, and carbon black as a function of pyrolysis temperature during pyrolysis of a rubber-containing material.

Some exemplary broad, intermediate, and narrow ranges for the possible daily production rate, per-batch production rate, and percent yield for each of the products produced by pyrolysis facility 10 shown in FIG. 1 are provided in Tables 1-3, below. Although shown in Tables 1-3 below as ranges, it should be understood that the average daily production rates shown in this table may be expressed as minimum or maximum values, using only the upper or lower endpoints of one or more ranges shown below. For example, as shown in Table 1 below, in some cases, pyrolysis facilities of the present invention may have a pyrolysis gas average daily production rate of not more than 130,000 cubic feet per day, while, in the same or other cases, a pyrolysis facility configured as described herein may have an average per-batch production rate of at least 50 pounds of metallic elements. Other ranges are also possible without departing from the scope of the present invention. Additionally, one example of a possible yield curve, showing the percent yield of pyrolysis gas, pyrolysis oil, and carbon black as a function of pyrolysis temperature, is shown in FIG. 7.

TABLE 1

Ranges for Average Daily Production Rate

| Product (rate) | Broad | Intermediate | Narrow |
|---|---|---|---|
| Pyrolysis gas (cubic feet/day) | 10,000-350,000 | 25,000-150,000 | 70,000-130,000 |
| Pyrolysis Oil (lbs/day) | 2,500-80,000 | 5,000-50,000 | 10,000-25,000 |
| Carbon Black (lbs/day) | 2,500-100,000 | 5,000-50,00 | 10,000-35,000 |
| Metal Elements (lbs/day) | 500-15,000 | 1,000-10,000 | 1,500-5,000 |

TABLE 2

Ranges for Average Per-Batch Production

| Product (in lbs) | Broad | Intermediate | Narrow |
|---|---|---|---|
| Pygas | 75-125 | 80-110 | 85-100 |
| Pyrolysis Oil | 175-400 | 200-350 | 225-325 |
| Carbon Black | 200-500 | 250-450 | 275-375 |
| Metal Elements | 40-80 | 50-75 | 55-70 |

TABLE 3

Ranges for Average Percent Product Split

| Product (wt %) | Broad | Intermediate | Narrow |
|---|---|---|---|
| Pygas | 5-25 | 10-20 | 10-15 |
| Pyrolysis Oil | 5-60 | 10-50 | 25-45 |
| Carbon Black | 10-70 | 20-60 | 35-55 |
| Metal Elements | 1-15 | 2-10 | 5-10 |

In some cases, one or more operating parameters of pyrolysis facility 10 may be selectively varied in order to influence the type, quality, and/or amount of one or more products being produced. For example, in some cases, the specific pyrolysis time and/or temperature may be adjusted for a specific feedstock in order to achieve a desired percent yield or production rate for one or more products, or to provide a product having a certain property. Because the type of feedstock introduced into pyrolysis facility 10 may vary widely in some cases, it may be useful to develop predetermined operating profiles for various feedstocks that provide target values, or ranges of target values, for key operating parameters that, when employed, provide one or more products having desirable properties.

The predetermined operating profiles may include prescribed values, or range of values, for at least one operating parameter associated with the pyrolysis step, or with the recovery of one or more products from the pyrolysis vapor or pyrolysis solids. In some cases, the operating profile can include target values for at least two, at least three, or four or more operating parameters. Examples of suitable operating parameters can include, but are not limited to, preheating temperature as a function of time, pyrolysis temperature as a function of time, maximum preheating temperature, minimum pyrolysis temperature, maximum pyrolysis temperature, preheating time, pyrolysis time, maximum hold temperature, hold time, maximum cooling temperature, cooling time, pyrolysis pressure, and pyrolysis oxygen content.

Other examples can include, but are not limited to, pyrolysis vapor scrubber overhead temperature, pyrolysis vapor scrubber overhead pressure, pyrolysis vapor scrubber liquid rate, pyrolysis vapor scrubber liquid temperature, pyrolysis splitter overhead temperature, and pyrolysis splitter overhead pressure. In some cases, the operating profile can include a prescribed value, or range of values, for only one of these operating parameters, while, in other cases, the operating profile can include values, or a range of values, for two or more operating parameters.

In some cases, the operating profile suitable for use within pyrolysis facility 10 may include a heating profile that specifies a range of prescribed pyrolysis temperatures as a function of cycle time. When a heating profile is used to control a pyrolysis cycle, the actual value of the pyrolysis temperature may vary by not more than 20° F., not more than 15° F., not more than 10° F., or not more than 5° F. from the prescribed pyrolysis temperatures provided by the heating profile.

In addition, the operating profile can also include a target value, or range of values, for at least one property of a pyrolysis product recovered from the pyrolysis vapor or pyrolysis solids. In some cases, the operating profile can include target values for at least two, at least three, or four or more properties of the same or of different pyrolysis products. For example, the operating profile can include target values for one or more properties of at least one product recovered from the pyrolysis vapor and/or target values for one or more properties of a product recovered from the pyrolysis solids. The property specified in the operating profile can be percent yield, daily production rate, or per-batch production rate as described above.

When the product comprises carbon black, the property included in the operating profile can include at least one of total nitrogen adsorption (ASTM D-6556), external surface area (ASTM D-6556), oil absorption number (ASTM D-3493), tint strength (ASTM D-3265), pour density (ASTM D-1513), sieve residue (ASTM D-1514), and fines content (ASTM D-1508). When the product is recovered from the pyrolysis vapor, the product property included in the operating profile can be, for example, initial boiling point (ASTM D-86), final boiling point (ASTM D-86), research octane number (ASTM D-2699), motor octane number (ASTM D-2700), density (ASTM D-4052), sulfur content (ASTM D-3120), flash point (ASTM D-93), and heating value (ASTM D-4891).

Further, the operating profile may also include at least one prescribed value for a feed property of the carbon-containing material to be pyrolyzed. In some cases, the operating profile may include a prescribed value for two or more different feed properties. Examples of suitable feed properties can include, but are not limited to, type of feed, weight of feed (per batch), particle size, and composition of feed. More particularly, if the pyrolyzable feed is a rubber-containing material, the feed properties included in an operating profile may include, but are not limited to, one or more of rubber composition, rubber additives (type and amount), type of tire, type of tire component, rubber particle size, weight of batch, percent metallic components, and percent recycled pyrolysis solids.

As a result of operating pyrolysis facility 10 according to a specified operating profile, one or more products produced by facility 10 may have values for one or more properties, including, for example, those listed above, that are within a certain amount of the target value for those properties as defined by the operating profile. More particularly, in some cases, one or more products produced by pyrolyzing a feedstock according to a given operating profile may have a measured value for at least one property that is within about 35, within about 30, within about 25, within about 20, within about 15, within about 10, or within about 5 percent of the target value for that property as provided in the operating profile. For example, operating pyrolysis facility 10 according to a given heating profile may provide a carbon black product having a particle size within about 35, within about 30, within about 25, within about 20, within about 15, within about 10, or within about 5 percent of the target value for carbon black particle size as provided in the operating profile. The specific combination of feed properties, values for operating parameters, and product properties present in a given profile may be any combination of those provided above, or may include other properties or parameters.

In some cases, operating profiles may be obtained from a third party, such as, for example, a feed supplier or other from another source, or the operating profiles may be created within the facility by collecting and assembling empirical data. More specifically, in some cases, operating profiles can be created by pyrolyzing various quantities of pyrolyzable material, recovering solid and/or fluid products from each batch of pyrolyzed material, and measuring, recording, and assembling values for one or more feed properties, operating parameters, and/or product properties into an operating profile.

More particularly, based on the value, or values, of the property, or properties, of the product measured during the pyrolysis and recovery steps, an operating profile may be constructed that comprises a prescribed value, or range of values, for at least one operating parameter associated with these steps. For example, an operating profile may be created that includes a prescribed value, or prescribed range of values, for one or more of preheating temperature as a function of time, pyrolysis temperature as a function of time, maximum preheating temperature, maximum pyrolysis temperature, preheating time, pyrolysis time, maximum hold temperature, hold time, maximum cooling temperature, cooling time, pyrolysis pressure, and pyrolysis oxygen content.

The operating profile may also include a target value, or range of values, for the property, or properties, of the recovered product measured as described above. Examples of suitable property values present in an operating profile can include, but are not limited to, percent yield, daily production rate, per-batch production rate, total nitrogen adsorption, external surface area, oil absorption number, tint strength, pour density, sieve residue, and fines content, initial boiling point, final boiling point, research octane number, motor octane number, density, sulfur content, flash point, and heating value. Other properties may also be measured, and, as discussed above, the operating profile may include one or more target values for a single property or one or more target values for two or more different product properties.

Furthermore, as discussed above, the method for creating an operating profile may also include the step of measuring a value for at least one property of the feed material prior to pyrolysis, and including a prescribed value, or range of values, for the feed property in the operating profile. Examples of suitable feed properties can include, but are not limited to, type of feed, weight of feed (per batch), particle size, and composition of feed. More particularly, if the pyrolyzable feed is a rubber-containing material, the feed properties may include, but are not limited to, rubber composition, rubber additives (type and amount), type of tire, type of tire component, rubber particle size, weight of batch, percent metallic components, and percent recycled pyrolysis solids.

The pyrolysis and recovery of test batches in order to create an operating profile may be performed on a laboratory scale, a pilot plant scale, or in a commercial facility. The measured values for the operating parameter, product property, and/or the feed property, if present, may be correlated to provide an operating profile, which can be subsequently used in future batches to provide products having predictable and desirable properties. More than one operating profile may be created for a single facility (or multiple facilities) by, for example, pyrolyzing different types of feed and/or pyrolyzing the material under different operating conditions. Once created, the operating profiles may be cataloged, manually or electronically, and stored for future use. In some cases, prior to pyrolysis of a new quantity of pyrolyzable feed stock, a selection can be made between two or more stored operating profiles based on, for example, the type of feedstock being processed and/or the type, amount, or specific property of products required. The selection process may include measuring at least one property of a feedstock and then comparing the measured value to a prescribed value, or range of prescribed values, in two or more operating profiles in order to determine a difference. In some cases, the operating profile selected for processing a given quantity of pyrolyzable feed stock may be the profile having a prescribed value for the feed property that is closest to (i.e., has the smallest difference from) the measured value of that property. The difference may be less than 20 percent, less than 15 percent, less than 10 percent, or less than 5 percent, based on the prescribed value of the feed property.

In other cases, the selection process may include determining a desired target value for at least one product to be recovered from a given quantity of pyrolyzable feed stock, and comparing the desired target value with the prescribed target value for that property provided in the operating profile. If the difference between the desired target value and the prescribed target value for that property of the product is within a desirable range, the operating profile having the target value for the property closest to (i.e., has the smallest difference from) may be selected to process that quantity of pyrolyzable feed stock. In some cases, the difference may be less than 20 percent, less than 15 percent, less than 10 percent, or less than 5 percent, based on the prescribed target value.

Pyrolysis facility 10 shown in FIG. 1 may further include combustion controls, safety interlocks, and furnace permissives (not shown) in order to prevent furnace start-up/operation under unsafe conditions and for further control of the pyrolysis process and its emissions. Additionally, pyrolysis facility 10 may further include an automated furnace control system, including temperature control and control of air/fuel ratio into furnace burner, an automatic control system capable of controlling and sequencing pyrolysis system with more than 3, more than 4, more than 6, more than 8, more than 10 or 12 crucibles. Further, pyrolysis facility 10 may include other devices, systems, or subsystems configured to facilitate enhanced production and/or efficiency without departing from the scope of the present invention.

Definitions

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Equivalents to determine and assess the reasonably fair scope of the present invention as pertains to any apparatus not materially departing from but outside the literal scope of the invention as set forth in the following claims.

What is claimed is:

1. A method of pyrolyzing a rubber-containing material, said method comprising:
   a. at least partially filling a first crucible with a first quantity of shredded vehicle tires; then applying a temporary seal with outlets for pyrolysis vapors;
   b. heating said first crucible in a pyrolysis zone to about 800° F. to about 900° F. under conditions sufficient to pyrolyze at least a portion of said first quantity of said vehicle tires to thereby provide pyrolysis vapors and pyrolysis solids, wherein said crucible is in a stationary position and does not rotate during said heating;
   c. withdrawing via a collection header any vapor phase formed within said first crucible to a downstream separation zone;
   d. holding the about 800 F to about 900 F temperature for a hold period of at least about 60 minute, and not more than about 300 minutes;
   e. stopping an active heating of said first crucible and continuing to heat said first crucible autothermally for another hold period of at least about 15 minutes;
   f. cooling via circulated air said pyrolysis solids within said first crucible to form a first quantity of cooled pyrolysis solids, wherein said first quantity of cooled pyrolysis comprises at least about 40% by weight carbon black and at least partially unpyrolyzed rubber-containing material;
   g. removing said temporary seal, and removing said cooled pyrolysis solids.

2. The method of claim 1 further comprising the step of capturing at least a portion of carbon black fines which are emitted into the surrounding environment during the removal of said cooled pyrolysis solids and adding the captured carbon black fines to the cooled pyrolysis solids.

3. The method of claim 1 further comprising the step of controlling pressure in the crucible during the holding the temperature to about 800° F. to about 900° F. step to a pressure range about at least 0.5 psig to not more than about 20 psig.

4. The method of claim 1 further comprising the step of controlling the oxygen content in the crucible during the holding the temperature to about 800° F. to about 900° F. step to be less than about 0.05 volume percent to about 0.005 volume percent.

5. The method of claim 1 further comprising the step of separating into various components the cooled pyrolysis solids.

6. The method of claim 1 further comprising the step of visually inspecting the cooled pyrolysis solids for signs of an unfinished pyrolysis clump and transferring out from the cooled pyrolysis solids the unfinished pyrolysis clump.

\* \* \* \* \*